United States Patent
Cline et al.

(10) Patent No.: US 9,261,372 B2
(45) Date of Patent: *Feb. 16, 2016

(54) USER-CENTRIC ANNOTATED LOCATION AWARE ASSET MAPPING

(71) Applicant: BMC Software, Inc., Houston, TX (US)

(72) Inventors: Troy Cline, Leander, TX (US); Ting He, Austin, TX (US); Wesley Gere, Austin, TX (US); Jason L. Graham, Austin, TX (US); Kia Behnia, Burlingame, CA (US)

(73) Assignee: BMC Software Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,528

(22) Filed: Aug. 22, 2014

(65) Prior Publication Data

US 2014/0365121 A1 Dec. 11, 2014

Related U.S. Application Data

(63) Continuation of application No. 13/731,264, filed on Dec. 31, 2012.

(60) Provisional application No. 61/717,635, filed on Oct. 23, 2012.

(51) Int. Cl.
G06T 11/20 (2006.01)
G01C 21/20 (2006.01)
(Continued)

(52) U.S. Cl.
CPC ........ *G01C 21/206* (2013.01); *G06F 17/30241* (2013.01); *G06F 17/30386* (2013.01); *G06F 17/30424* (2013.01); *G06Q 30/0259* (2013.01); *G06T 11/206* (2013.01); *H04L 67/18* (2013.01);
(Continued)

(58) Field of Classification Search
None
See application file for complete search history.

(56) References Cited

U.S. PATENT DOCUMENTS 6,278,940 B1 8/2001 Endo
6,353,445 B1 3/2002 Babula et al.
(Continued)

FOREIGN PATENT DOCUMENTS

WO 20141066342 A1 5/2014
WO 20141066346 A1 5/2014
WO 20141066347 A1 5/2014

OTHER PUBLICATIONS

Non-Final Office Action received for U.S. Appl. No. 13/731,330, mailed on Aug. 14, 2014, 9 pages.
(Continued)

*Primary Examiner* — Edward Martello
(74) *Attorney, Agent, or Firm* — Brake Hughes Bellermann LLP

(57) ABSTRACT

According to one general aspect, a method may include receiving a floor map indicating a structural layout of a physical location, receiving a point-of-interest (POI) data structure representing a POI and POI metadata associated with the POI, POI data structure including a location of an associated POI that is associated with the POI, and the POI metadata including a POI type indicating a type of the associated POI, and a POI status indicating the status of the associated POI, annotating the floor map by overlaying on the selected floor map an indicator for each selected POI data structure such that the indicator is placed on the floor map at a location representing the physical location of the respective associated POI and indicates the type of the associated POI and the status of the associated POI, displaying a portion of the annotated floor map, and initiating a POI action.

18 Claims, 9 Drawing Sheets

(51) Int. Cl.
    *H04W 4/00* (2009.01)
    *G06F 17/30* (2006.01)
    *H04L 29/08* (2006.01)
    *H04W 4/02* (2009.01)
    *H04W 4/04* (2009.01)
    *G06Q 30/02* (2012.01)

(52) U.S. Cl.
    CPC .............. *H04W 4/005* (2013.01); *H04W 4/008* (2013.01); *H04W 4/02* (2013.01); *H04W 4/021* (2013.01); *H04W 4/043* (2013.01)

(56) References Cited

U.S. PATENT DOCUMENTS

| | | |
|---|---|---|
| 2007/0192486 A1 | 8/2007 | Wilson et al. |
| 2009/0315995 A1 | 12/2009 | Khosravy et al. |
| 2010/0070055 A1 | 3/2010 | Kennedy et al. |
| 2010/0121567 A1 | 5/2010 | Mendelson |
| 2010/0157848 A1 | 6/2010 | Das et al. |
| 2010/0309897 A1 | 12/2010 | Harris et al. |
| 2011/0007901 A1 | 1/2011 | Ikeda et al. |
| 2011/0037712 A1 | 2/2011 | Kim et al. |
| 2012/0039316 A1 | 2/2012 | Park et al. |
| 2012/0075068 A1 | 3/2012 | Walker et al. |
| 2012/0096147 A1 | 4/2012 | Sakamoto |
| 2012/0316963 A1 | 12/2012 | Moshfeghi |
| 2013/0035110 A1 | 2/2013 | Sridhara et al. |
| 2013/0184012 A1 | 7/2013 | Gupta et al. |
| 2013/0262223 A1 | 10/2013 | Catane et al. |
| 2014/0087770 A1 | 3/2014 | Cho et al. |
| 2014/0113559 A1 | 4/2014 | Cline et al. |
| 2014/0114931 A1 | 4/2014 | Cline et al. |
| 2014/0365489 A1 | 12/2014 | Cline et al. |

OTHER PUBLICATIONS

Non-Final Office Action received for U.S. Appl. No. 13/731,309, mailed on Oct. 24, 2014, 13 pages.
Non-Final Office Action received for U.S. Appl. No. 14/466,559, mailed Dec. 23, 2014, 16 pages.
International Application Serial No. PCT/US2013/066107, International Search Report and Written Opinion mailed on Feb. 17, 2014, 9 pages.
International Application Serial No. PCT/US2013/066112, International Search Report and Written Opinion mailed on Feb. 17, 2014, 9 pages.
International Application Serial No. PCT/US2013/066113, International Search Report and Written Opinion mailed on Feb. 17, 2014, 9 pages.
Non-Final Office Action received for U.S. Appl. No. 13/731,264, mailed on Jan. 12, 2015, 17 pages.
Final Office Action Received for U.S. Appl. No. 13/731,330, mailed on Apr. 1, 2015, 12 pages.
Final Office Action Received for U.S. Appl. No. 13/731,309, mailed on Apr. 17, 2015, 16 pages.
Final Office Action Received for U.S. Appl. No. 14/466,559, mailed on Apr. 20, 2015, 18 pages.
Abowd et al., "Cyberguide: A Mobile Context-Aware Tour Guide", Baltzer Journals; Graphics, Visualization and Usability Centre; College of Computing, Georgia Institute of Technology, Sep. 1996, pp. 1-21.
International Preliminary Report on Patentability for International Application No. PCT/US2013/066107, mailed May 7, 2015, 7 pages.
International Preliminary Report on Patentability for International Application No. PCT/US2013/066112, mailed May 7, 2015, 7 pages.
International Preliminary Report on Patentability for International Application No. PCT/US2013/066113, mailed May 7, 2015, 7 pages.

USER-CENTRIC ANNOTATED LOCATION AWARE ASSET MAPPING

CROSS-REFERENCE TO RELATED APPLICATION

This application is a continuation application of U.S. application Ser. No. 13/731,264, entitled "User-Centric Annotated Location Aware Asset Mapping", filed Dec. 31, 2012, which claims priority under 35 U.S.C. §119 to Provisional Patent Application Ser. No. 61/717,635, entitled "WORKPLACE ASSET IDENTIFICATION, LOCATION AND CONTEXT AWARE TAGGING AND STATUS" filed on Oct. 23, 2012. The subject matter of both applications are hereby incorporated by reference in their entirety.

TECHNICAL FIELD

This description relates to asset management, and more specifically to the tagging and use of physical objects or locations.

BACKGROUND

Typically a company or sufficiently large organization has shared resources or assets that various people use. In some instances those shared resources may include things or physical objects, such as, for example copiers, printers, fax machines, traveler's workstations or computers (e.g., an unassigned computer available for use by travelling or transient workers), etc. In some instances those shared resources may include locations, such as, for example, conference rooms, traveler's workstations or "hot" desks (i.e., an unassigned office space available to travelling or transient workers), etc.

Often times, it may be difficult someone to locate these shared resources, particularly if one is visiting a corporate site that one does not often visit or has never been to. For example, a worker might work at a company's Austin site but when that worker visits the company's San Jose site, they may find it difficult to locate usable office space, or printers, etc. Frequently, even if such a resource is found (e.g., an empty desk) such a worker may not even know if they are allowed to use the resource. It may be embarrassing for the worker to sit down at and begin to use an empty desk only to find out that the desk is reserved for someone else. Alternately, it may be frustrating to attempt to use a printer only to find out that the printer is out of order and that the search for a new printer must begin again. Other irritations and issues may arise when attempting to use shared resources.

In some case, even when a desired shared resource is located, there might be additional steps or actions that may need to be performed or additional resources may need to be located in order to use the resource. For example, a worker might need instructions on using the video or presentation equipment. In another example, even though a working printer has been found, the printer paper supply might be low or empty and the worker may need to locate more paper.

Likewise, often local or non-traveling employees, members of the organization, or guests, have a similar need of need to know if a desired resource is available or functional. Traditionally, a worker would have to physically go to the resource or location and find out it may or may not be available or functional. For example, to see if a conference room is available, one needs to travel to actual conference room and look to see if anyone is using it. Such a traditional scheme costs valuable time and has the disadvantage of not always being accurate (e.g., a conference room may be reserved but the reserver may simply be late, leading the worker to incorrectly view the empty conference room as available when it is not, etc.).

Often any of these or other problems may occur and often a worker does not know who to contact to resolve the problems or what to do to use the resources correctly and effectively.

SUMMARY

According to one general aspect, a method of using an apparatus may include receiving, from a remote computing device, a floor map indicating the structural layout of a predefined physical location. The method may also include receiving, from the remote computing device, a point-of-interest (POI) data structure representing a point-of-interest and point-of-interest metadata associated with the point-of-interest. The point-of-interest data structure may include a location of an associated POI that is associated with the point-of-interest, and the point-of-interest metadata may include a point-of-interest type indicating a type of the associated POI, and a point-of-interest status indicating the status of the associated POI. The method may include annotating the selected floor map by overlaying on the selected floor map an indicator for each selected POI data structure such that the indicator is placed on the floor map at a location representing the physical location of the respective associated POI and indicates both the type of the associated POI and the status of the associated POI. The method may include displaying, via a display interface, at least a portion of the annotated floor map. The method may include initiating a POI action for a respective associated POI via the indicator for the respective POI.

According to another general aspect, an apparatus may include a network interface, a display interface, and a processor. The network interface may be configured to: receive, from a remote computing device, a floor map indicating the structural layout of a predefined physical location, and receive, from the remote computing device, a point-of-interest (POI) data structure representing a point-of-interest and point-of-interest metadata associated with the point-of-interest. The point-of-interest data structure may include a location of an associated POI that is associated with the point-of-interest, and the point-of-interest metadata may include a point-of-interest type indicating a type of the associated POI, and a point-of-interest status indicating the status of the associated POI. The processor may be configured to generate an annotated floor map, based upon the floor map and including a point-of-interest indicator, wherein the point-of-interest indicator is placed on the floor map at the location of an associated point of interest and indicates both the type of the associated point of interest and at least part of the status of the associated point of interest. The display interface may be configured to display at least a portion of the annotated floor map.

According to another general aspect, a computer program product for asset management, may be tangibly and non-transitorily embodied on a computer-readable medium. The computer program product may include executable code that, when executed, is configured to cause an apparatus to: receive, from a remote computing device, a floor map indicating the structural layout of a predefined physical location; receive, from the remote computing device, a point-of-interest (POI) data structure representing a point-of-interest and point-of-interest metadata associated with the point-of-interest, wherein the point-of-interest data structure includes a location of an associated POI that is associated with the point-of-interest, and wherein the point-of-interest metadata includes a point-of-interest type indicating a type of the associated POI, and a point-of-interest status indicating the status of the associated POI; annotate the selected floor map by overlaying on the selected floor map an indicator for each selected POI data structure such that the indicator is placed on the floor map at a location representing the physical location of the respective associated POI and indicates both the type of the associated POI and the status of the associated POI; display, via a display interface, at least a portion of the annotated floor map; and initiate a POI action for a respective associated POI via the indicator for the respective POI.

According to one general aspect, a method may include storing, in a memory device, a plurality of floor maps, each floor map indicating the structural layout of a respective predefined physical location. The method may include storing, in a memory device, a plurality of point-of-interest (POI) data structures. Each point-of-interest data structure may include a physical location of an associated POI that is associated with the respective point-of-interest data structure. The method may include receiving a floor map request from a client computing device, wherein the floor map request includes a requested location. The method may include based upon the location included by the floor map request, selecting a selected floor map and a selected subset of the plurality of POI data structures. The method may include transmitting, to the client computing device, a response to the floor map request based upon the selected floor map and the selected POI data structures.

According to another general aspect, an apparatus may include a storage medium, a network interface, and a processor. The storage medium may be configured to store a plurality of floor maps, each floor map indicating the structural layout of a respective predefined physical location, and store a plurality of point-of-interest (POI) data structures. Each point-of-interest data structure includes a physical location of an associated POI that is associated with the respective point-of-interest data structure. The network interface may be configured to receive a floor map request from a client computing device, wherein the floor map request includes a requested location. The processor may be configured to, based upon the location included by the floor map request, select a selected floor map and a selected subset of the plurality of POI data structures, and transmit, to the client computing device, a response to the floor map request based upon the selected floor map and the selected POI data structures.

According to another general aspect, a computer program product for asset management may be tangibly and non-transitorily embodied on a computer-readable medium. The computer program product may include executable code that, when executed, is configured to cause an apparatus to: store, in a memory device, a plurality of floor maps, each floor map indicating the structural layout of a respective predefined physical location; store, in a memory device, a plurality of point-of-interest (POI) data structures, wherein each point-of-interest data structure includes a physical location of an associated POI that is associated with the respective point-of-interest data structure; receive a floor map request from a client computing device, wherein the floor map request includes a requested location; based upon the location included by the floor map request, select a selected floor map and a selected subset of the plurality of POI data structures; and transmit, to the client computing device, a response to the floor map request based upon the selected floor map and the selected POI data structures.

According to one general aspect, a method may include establishing a short-range wireless communication between a user device and a point-of-interest (POI) device, wherein the POI device is associated with a POI data structure that represents a physical POI. The method may include receiving a request to perform a POI action in regards to the physical POI. The method may include causing the POI action to be performed.

According to another general aspect, an apparatus may include a short-range wireless interface and a processor. The short-range wireless interface may be configured to establish a short-range wireless communication between the apparatus and a point-of-interest (POI) device, wherein the POI device is associated with a POI data structure that represents a physical POI. The processor may be configured to receive a request to perform a POI action in regards to the physical POI, and cause the POI action to be performed.

According to another general aspect, a computer program product for asset management may be tangibly and non-transitorily embodied on a computer-readable medium. The computer program product may include executable code that, when executed, is configured to cause an apparatus to: establish a short-range wireless communication between the apparatus and a point-of-interest (POI) device, wherein the POI device is associated with a POI data structure that represents a physical POI; receive a request to perform a POI action in regards to the physical POI; and cause the POI action to be performed.

The details of one or more implementations are set forth in the accompanying drawings and the description below. Other features will be apparent from the description and drawings, and from the claims.

A system and/or method for asset management, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
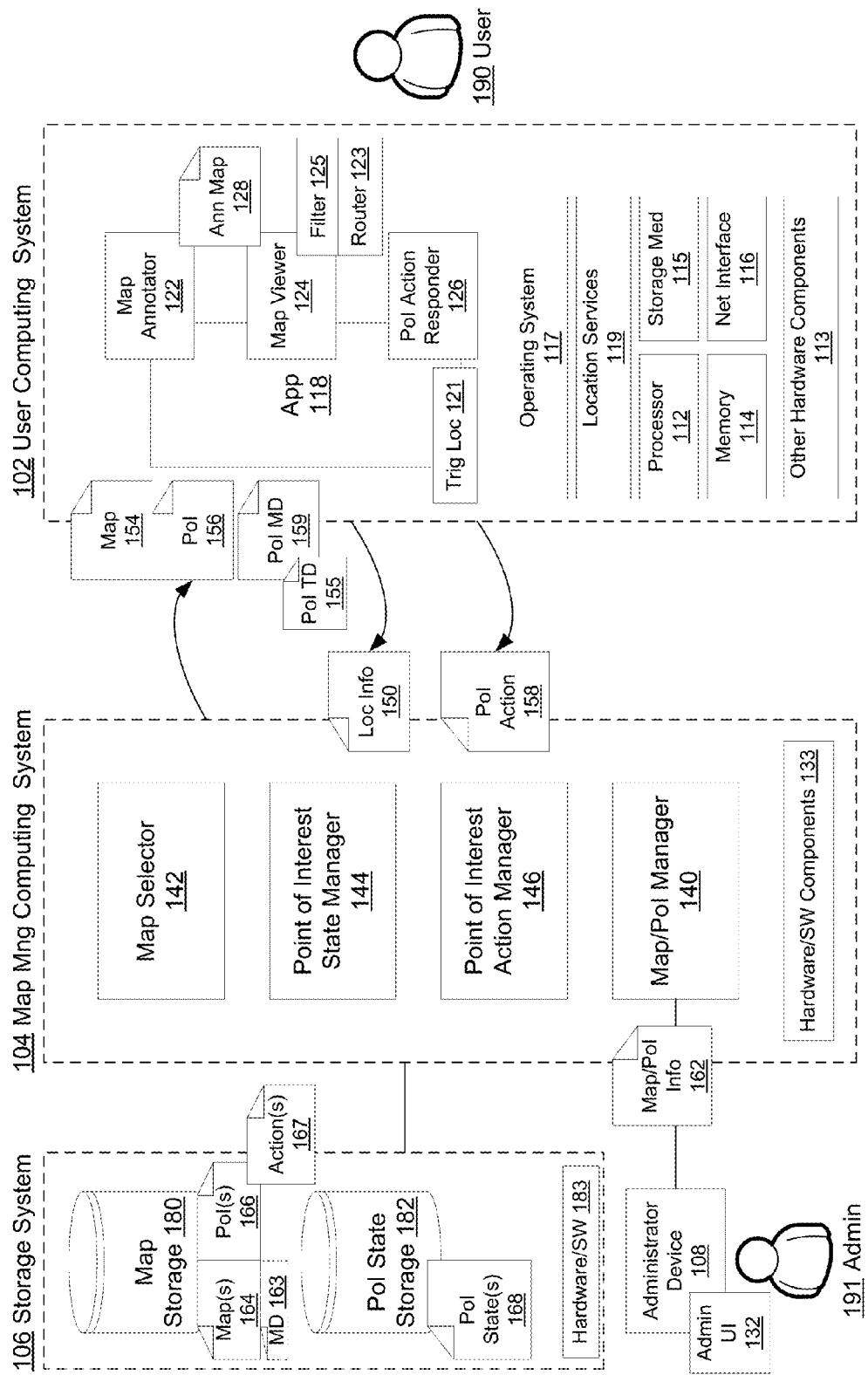
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a user computing system or device 102, a map or asset management computing system or device 104, one or more storage computing devices or systems 106. In some embodiments, the system 100 may also include an administrator device 108.

In various embodiments, the user device 102 may include a computing device, such as, for example, a laptop, desktop, workstation, personal digital assistant, smartphone, tablet, and other appropriate computers, etc. or a virtual machine or virtual computing device thereof. In various embodiments, the user device 102 may be used by a user 190. In various embodiments, the user device 102 may include a processor 112 configured to execute one or more machine executable instructions or pieces of software, firmware, or a combination thereof. The user device 102 may include, in some embodiments, a memory 114 configured to store one or more pieces of data, either temporarily, permanently, semi-permanently, or a combination thereof. Further, the memory 114 may include volatile memory, non-volatile memory or a combination thereof. In various embodiments, the user device 102 may include a storage medium 115 configured to store data in a semi-permanent or substantially permanent form. In various embodiments, the storage medium 115 may be included by the memory 114.

In various embodiments, the user device 102 may include one or more network interfaces 116 configured to allow the user device 102 to be part of and communicate via a communications network. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the user device 102 may include one or more other hardware components 113 (e.g., a display or monitor, a keyboard, a mouse, a camera, a fingerprint reader, a video processor, etc.). It is understood that the above are merely a few illustrative examples to which the disclosed subject matter is not limited.

In the illustrated embodiment, the user device 102 may include one or more location services 119. In one such embodiment, the location services 199 may be configured to indicate where the user device 102 is physically located within a certain amount of precision (often determined by the technology used for detecting the location). In various embodiments, this location service 199 may include a Global Positioning System (GPS) receiver or detector. In another embodiment, the location service 199 may include a control plane locator, such as, a device configured to determine the distance of the user device 102 from one or more cell-phone (or other radio signal) towers or broadcasters. In another embodiment, the location service 119 may be configured to estimate the user device's 102 location based upon a time difference of arrival or other time-based technique. In yet another embodiment, the location service 199 may be configured to estimate the user device's 102 location based upon a local-range (e.g., <30 meters, Bluetooth, wireless local area network (WLAN) signals, near field communication (NFC), radio-frequency identification (RFID) tags, etc.) signals or another form of a local position system (LPS). In various embodiments, the location service 199 may be configured to make use of triangulation, trilateration, multilateration, or a combination thereof. In various embodiments, location service 199 may be configured to make use of one or more of these examples either in combination or alone. It is understood that the above are merely a few illustrative examples to which the disclosed subject matter is not limited.

In various embodiments, the user device 102 may include an operating system (OS) 117 configured to provide one or more services to an application 118 and manage or act as an intermediary between the application 118 and the various hardware components (e.g., the processor 112, a network interface 116, etc.) of the user device 102. In such an embodiment, the user device 102 may include one or more native applications, which may be installed locally (e.g., within the storage medium 115, etc.) and configured to be executed directly by the processor 112 and directly interact with the OS 117. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 112.

In various embodiments, the user 190 may be travelling to a new environment or work place, although the illustrated embodiment would be just as valid for a location that the user 190 frequents. It is understood that the below is merely one illustrative example to which the disclosed subject matter is not limited. In such an embodiment, the user 190 may wish to see or be made aware of the various assets, physical resources, or points of interests (POIs) around the user 190 in this location.

In such an embodiment, the user device 102 may execute an application 118 configured to display a map 128 (e.g., the map 200 of FIG. 2, etc.) to the user 190. This map 128 may include a floor map or map 154 and one or more points of interest 156.

In this context, a "floor map" includes a map or data structure that may be interpreted as a geographic diagram of a given or associated location or route. In this context, a "point of interest" is a term used to describe both physical objects, such as, for example a copier, printer, fax machine, traveler's workstation or computer, etc. and/or locations, such as, for example, a conference room, desk, etc. In this context, the term "point of interest" may be used to both describe the object/location itself or a data structure that represents or is associated with the physical object/location itself and used to represent that physical object/location to a computing device (e.g., those in system 100, etc.) or software application (e.g., application 118 of FIG. 1).

However, while the examples described herein show and describe a floor of an office building, and PoIs that are typical of an office environment (e.g., printers, coffee machines, conference rooms, etc.), it is understood that such are merely a few illustrative examples to which the disclosed subject matter is not limited. In another embodiment, the "floor map" may include a diagram of a rack of servers in data center. In such an embodiment, the PoIs may include various server racks or particular server in a given rack. In another embodiment, the "floor map" may include a diagram of computer network, and the PoIs may include various computing devices, access points, gateways, servers, and/or routers on the network. It is understood that the above are merely a few illustrative examples to which the disclosed subject matter is not limited.

Figure 2:
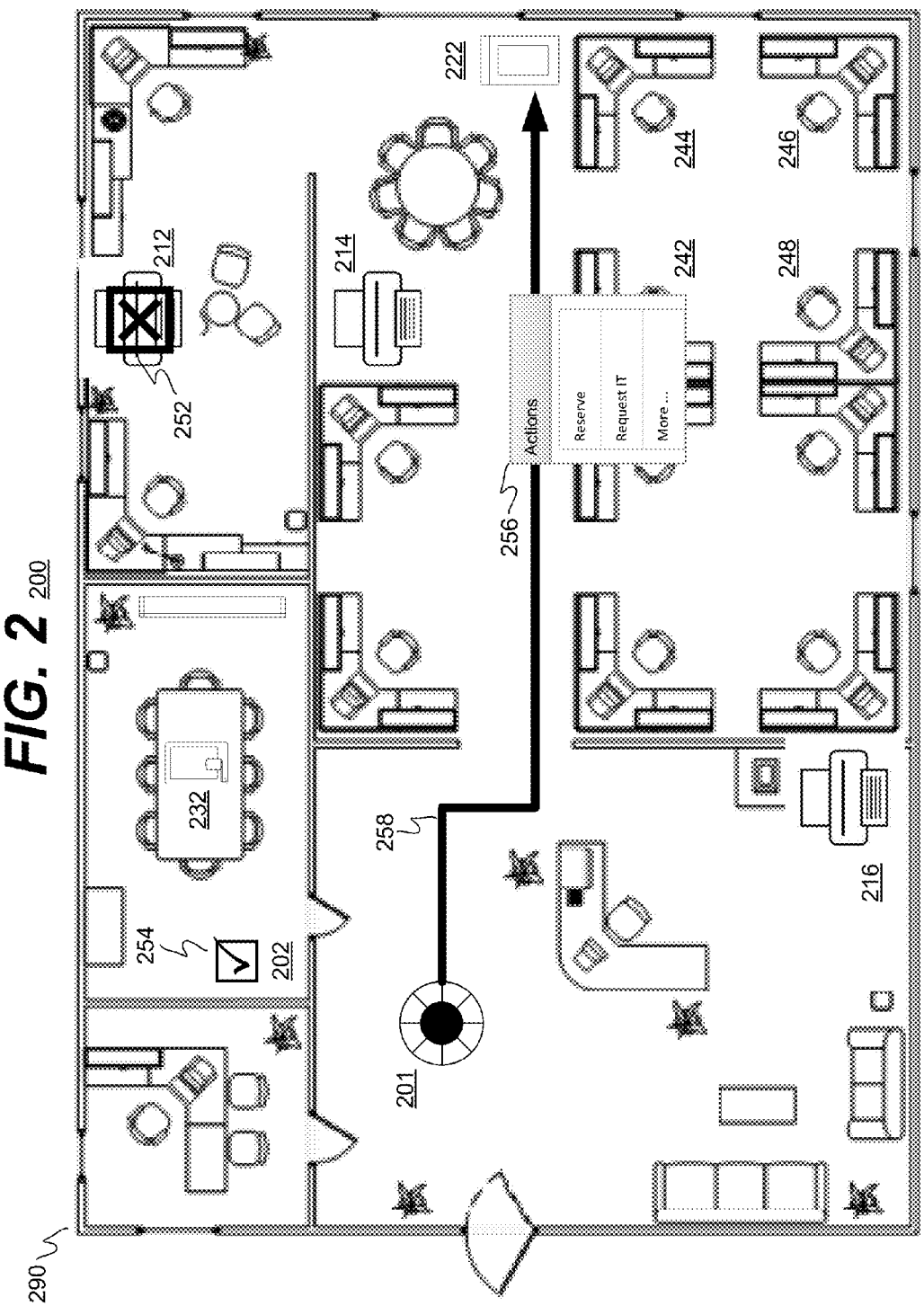
FIG. 2 is a diagram of an example embodiment of an annotated map in accordance with the disclosed subject matter.

FIG. 2 is a diagram of an example embodiment of an annotated map 200 in accordance with the disclosed subject matter. In the illustrated embodiment, the map 200 may include a floor plan or map 290 and one or more points of interest (e.g., printer 216, etc.). It is understood that the above is merely one illustrative example to which the disclosed subject matter is not limited.

In one embodiment, the map 200 may include the floor plan or map 290. In various embodiments, this floor map may show or describe the location of various structural features of a given location (e.g., a floor of an office building, etc.). In some embodiments, the structural features may include, but are not limited to, walls, doors, desks, furniture, sinks, toilets, elevators, plants, etc. In some embodiments, these floor maps 290 may be stored as images (e.g., a Joint Photographic Experts Group (jpeg) image, bitmap, scalable vector graphic, etc.) or as an array or other data structure that the displaying or manipulating application may read and display to the user as a human readable floor plan or map.

As described above, in the illustrated embodiment, the map 200 may include one or more points of interest (e.g., printer 216, etc.). As described above, these PoIs may include physical objects (e.g., printer 216, etc.), locations (e.g., conference room 202, etc.), or PoIs that are a combination of both (e.g., hot desk 244 that includes both a computer and a workspace, etc.). In various embodiments, these PoIs may be received by the displaying or manipulating application as a data structure that is then interpreted and displayed to the user as a human readable indicator (e.g., icon, rectangle, etc.).

In the illustrated embodiment, the map 200 may include a number of PoIs such as, conference room 202; printers 212, 214 & 216; scanner 222; projector 232; and traveler's workstations or hot desks 242, 244, 246 & 248. In various embodiments, some of these PoIs may be indicated by an icon or other graphic representation (e.g., text, etc.). In the illustrated embodiment, such PoIs include the printer icons associated with the printers 212, 214, and 216; the scanner icon for scanner 222; and the projector icon 232. Conversely, in some embodiments, one or more PoIs may not be indicated by an icon or any graphical indicator or may be indicated by a coloring or region box or area laid over the floor plan 290. In the illustrated embodiment, such PoIs may include the conference room 202; and the hot desks 242, 244, 248 & 246. In various embodiments, the PoI icons or indicators may be associated with physical objects (e.g., printers, etc.), while the region boxes or non-graphical indicators may be associated with locations (e.g., conference rooms, kitchens, etc.). It is understood that the above are merely a few illustrative examples to which the disclosed subject matter is not limited.

In such an embodiment, the map 200 may indicate where, physically, a given PoI is located. For example, map 200 indicates that the scanner 222 is located on the right-most edge of the floor map 290. In the illustrated embodiment, the map 200 indicates this by placing an icon for PoI 222 in the same place relative to the floor map 290 as the actual scanner is to the actual floor or office described by the floor map 290. In such an embodiment, a user may determine where physically a desired PoI is.

In the illustrated embodiment, the location of the user or user device is displayed by the icon or indicator 201. In such an embodiment, a user that is searching for a scanner may look at the map 200, locate the scanner 222, themselves (via icon 201), and then determine how to get from the location 201 to the location 222 (e.g., walk straight back to the right-most wall of the floor, etc.). In some embodiments, the displaying or manipulating application may to generate and/or display a route 258 showing the user how to get from their current location 201 (or other location) to a desired PoI (e.g., scanner 222, etc.).

In various embodiments, the PoI data structures may include an indication or field that indicates the physical location of PoI associated with the PoI data structure. In some embodiments, this location may be relative to the floor map 290, to another PoI, to a certain point of or on the floor map (e.g., 0.5 feet from the middle window of the right wall, etc.). In another embodiment, this location may be an absolute location, such as, a GPS coordinate, etc. It is understood that the above are merely a few illustrative examples to which the disclosed subject matter is not limited.

In various embodiments, the PoI data structures may include an indication or field that indicates the type of PoI associated with the PoI data structure. In various embodiments, these PoI types may describe what kind of physical object or location the PoI is (e.g., printer, copier, conference room, etc.). In such an embodiment, the displaying or manipulating application may use this type indication to decide what type of icon to display on the map 200 (e.g., select a printer icon for a printer typed PoI, select a triangle shape for a toilet, etc.). In another embodiment, as described below, the displaying or manipulating application may also use this type indication to decide what default actions or states the PoI may be associated with.

In some embodiments, the PoI data structures may include an indication or field that indicates a sub-type of PoI associated with the PoI data structure. For example, in one embodiment, a printer-type may include sub-types such as black & white, LaserJet, color, plotter printer, etc. In various embodiments, the PoI sub-type may dictate or alter the icon or indicator used to display the associated PoI. For example, the icon used for a color inkjet printer may differ from the icon used for a black & white high-volume laser printer. It is understood that the above is merely one illustrative example to which the disclosed subject matter is not limited.

In another example, the PoI data structures may include an indication or field that indicates a property of the PoI associated with the PoI data structure. In such an embodiment, the property field may include a sub-type but may also include other properties such as conference room capacity, capabilities of the PoI (e.g., able to print in duplex, etc.). In some embodiments, a PoI may include multiple sub-types and/or properties. For example, a "multi-use" type PoI may include a "black & white printer" sub-type, a "black & white copier" sub-type, and a "black & white scanner" sub-type. Likewise, a printer PoI may include a "duplex" property, a "1200×1200 dots per inch (dpi)" property, a "500 sheets maximum" property, etc. It is understood that the above are merely a few illustrative examples to which the disclosed subject matter is not limited.

In various embodiments, the PoI data structures may include a "state" property or field that indicates the status or usability of the associated PoI. In one embodiment, a PoI of conference room or other location type may include a state variable or field of "open", "reserved", "in-use", "closed", etc. In another embodiment, a PoI of printer or other object type may include a state variable or field of "working", "jammed", "out of paper", "out of ink", "more than 10 jobs queued", etc. In such an embodiment, the list of possible states for a given PoI may vary based upon the type of the PoI. In some embodiments, the list of possible states for a given PoI may be manually set or assigned by an administrator or other user that maintains the map 200 (as described below in reference to FIG. 1). It is understood that the above are merely a few illustrative examples to which the disclosed subject matter is not limited.

In some embodiments, the map 200 may include one or more indications of the particular state of a given PoI. In the illustrated embodiment, the printer 212 may be jammed or otherwise be associated with a non-working state. In such an embodiment, the map 200 may include an icon 252 that indicates that the printer 22 is in or associated with a non-working state. Likewise, the conference room 202 may be "open", or neither "in-use" nor "reserved" (at the time of day that map 200 is being displayed). In such an embodiment, the map 200 may include an icon 254 indicated that the conference room 202 is free for use. It is understood that the above are merely a few illustrative examples to which the disclosed subject matter is not limited.

In various embodiments, the state indicators or icons (e.g., icons 252 and 254, etc.) may include an overlay or variation of the type icons or indicators used for the PoIs (e.g., a variation of the printer icon used for printer 214, etc.). In various embodiments, the PoI's icon or indicator (e.g., shape, text, etc.) may be color-coded to indicate its state or status. In one embodiment, here color codes may be used or employed. In such an embodiment, green may indicate that the PoI or resource is functional and/or available; yellow or orange may indicate that the PoI is functional but in use; and red may indicate that the resource is non-functional (e.g., closed for maintenance, jammed, etc.). In some embodiments, the determine as to whether a PoI is "in-use" or any other state may be based upon a predefined threshold, such as, more than 5 print jobs queued, more than 4 megabytes (MBs) of data queued to this device, etc. It is understood that the above are merely a few illustrative examples to which the disclosed subject matter is not limited.

In some embodiments, a PoI may be associated with one or more actions. In this context, an "action" or "PoI action" includes more or more processes of doing things in order to achieve respective purposes related to the PoI. In a preferred embodiment, one or more actions may be tailored to the PoI-type or properties associated with the PoI. For example, actions associated with a conference room PoI may include reserving the conference room at a certain time, removing a conference room reservation, indicating that a conference room is in use, etc. In another example, actions associated with a printer PoI may include printing a document, filling the printer with paper, rebooting the printer, deleting a print job form the printer's queue, clearing a paper jam, etc. In another example, actions associated with a coffee machine PoI may include starting the coffee making process, filling the coffee machine with ingredients (water, filter, coffee beans, etc.). In yet another embodiment, actions associated with a projector PoI may include turning the projector on, pairing or placing the projector in communication with another computing device (e.g., the user's laptop, tablet, etc.), reading an operations manual or instructions leaflet, etc. It is understood that the above are merely a few illustrative examples to which the disclosed subject matter is not limited.

In some embodiments, these PoI actions may be broadly divided into two groups: automated and manual. In such an embodiment, an automated PoI action may include an action wherein the process of doing the action is performed by one or more devices (e.g., an external or remote server, the PoI itself, etc.). Examples of such actions may include, printing a documents, causing a calendaring server application to reserve a conference room, etc. Such actions are described in more detail in relation to FIG. 3. It is understood that the above are merely a few illustrative examples to which the disclosed subject matter is not limited.

In another embodiment, manual actions may include actions that are performed by a human being (e.g., clearing a paper jam, etc.). In such an embodiment, the manual action may include a notification that the action has been performed or is about to be performed. In such an embodiment, the action may cause the state or status of the PoI to be changed.

In some embodiments, the actions associated with the PoI or displayed to the user may differ based upon a status of the user. For example, an employee charged with maintaining Information Technology resources may be allowed to perform or shown more actions than a normal employee. In another example, only employees associated with a particular business unit or high-level employee may be able to reserve a certain conference room. In various embodiments, the PoI actions may be associated various levels of privilege or user groups. It is understood that the above are merely a few illustrative examples to which the disclosed subject matter is not limited.

In various embodiments, a user mat select (e.g., click on, touch the icon of, etc.) a PoI (e.g., desk 242, etc.). In such an embodiment, in response to the user's selection, the displaying or managing application may display a graphical user interface (GUI) element (e.g., menu 256, etc.). In some embodiments, the GUI element 256 may display or offer one or more actions that the user may select or request be performed (e.g., reserve the desk 242, request IT help, etc.). In various embodiments, the GUI element 256 or sub-elements (e.g., a menu item, etc.) may, when selected, cause other GUI elements to be displayed.

In some embodiments, the GUI element 256 may also include the ability to examine or check the state or status PoI or one or more properties or the PoI. In the illustrated embodiment, this ability is illustrated by the menu item "More . . . ". In another embodiment, the state or a property of the PoI may be displayed or indicated in a different manner (e.g., the color overlay, as described above, etc.). In yet another embodiment, the state or a property of the PoI may be displayed or indicated via a second GUI element (e.g., a tooltip, a pop-up dialog box, etc.). It is understood that the above are merely a few illustrative examples to which the disclosed subject matter is not limited.

Returning to FIG. 1, as described above, in various embodiments, the application 118 may be configured to display a map 128 to the user 190. This map 128 may include a floor plan or map 154 and be annotated with one or more PoIs 156, as described above.

In the illustrated embodiment, the system 100 may include an administrator device 108. In various embodiments, the administrator device 108 may include a computing device, such as, for example, a laptop, desktop, workstation, personal digital assistant, smartphone, tablet, and other appropriate computers, etc. or a virtual machine or virtual computing device thereof. In various embodiments, the administrator device 108 may be used by a user or administrator 191. In various embodiments, the administrator device 108 may include hardware and/or software components (not illustrated) analogous to those described above in reference to user device 102.

In various embodiments, the administrator 191 or others like the administrator 191 may be responsible for populating a database or storage (e.g., map storage 180, etc.) with one or more floor plans or maps 164. In some embodiments, the administrator 191 may also be responsible for populating a database or storage (e.g., map storage 180, etc.) with one or more PoIs 166. Further, in various embodiments, the administrator 191 may be responsible for maintaining, editing, or updating these maps 164 and PoIs 164.

In the illustrated embodiment, the administer 191 may use the administrator user interface (UI) or application 132 to import (and the edit or maintain, etc.) graphic images or data structures that represent floor maps into the map storage 180. In various embodiments, the floor maps 164 may include data that includes a description of the floor map 164 (e.g., "Building H, Floor 2", "Winnipeg Office, Ground Floor", etc.), and a geographical location or coordinates where the associated physical floor exists. In various embodiments, other information may be included. In some embodiments, such information may not be stored within the floor map 164 itself, but in a separate format as floor map metadata 163. In one embodiment, the information may be stored in a variety of formats (e.g., as part of the floor map's 164 filename, as part of a metadata tag include by the floor map, as a separate file, etc.). In various embodiments, the floor map metadata 163 and the floor map 164 may be stored in a variety of formats, such as for example a text-based file (e.g., Extensible Markup Language (XML), JavaScript Object Notation (JSON), Comma-separated values (CSV), etc.), a binary-based format (e.g., zip compression format, JPEG, a serialized object-oriented data structure or object, etc.), or a combination thereof. It is understood that the above are merely a few illustrative examples to which the disclosed subject matter is not limited.

In the illustrated embodiment, the administrator 191 may use the administrator user interface (UI) or application 132 to import (and the edit or maintain, etc.) one or more PoIs 166 to the map storage 180. In some embodiments, the administrator UI 132 may be configured to allow or facilitate the ability for an administrator 191 to place points of interest (PoIs) 166 on the map 164 via a graphical paradigm, similar to placing items via a drawing program.

In various embodiments, each PoI 166 may include the coordinate (absolute or relative, as described above) of the PoI 166. In some embodiments, the PoI 166 may also include one or more properties such as, for example, a name of the PoI 166, a PoI type and/or sub-type (e.g., printer, conference room, etc.), a human readable description of the PoI (e.g., "Marketing's Printer", "Conference Room 101", etc.), etc., as described above. In some embodiments, the PoI such metadata (e.g., type, properties, etc.) may be stored with or as part of the PoI (as illustrated) or as one or more spate files, or a combination thereof. It is understood that the above are merely a few illustrative examples to which the disclosed subject matter is not limited.

As described above, in some embodiments, one or more actions 167 may be associated with or included by various PoIs 166. In various embodiments, these actions 167 may include, but are not limited to, a phone number (which could integrate with the PoI's native phone features), an email address (which could integrate with the PoI's native email client), a uniform resource identifier (URI) or uniform resource locator (URL), a workflow action which may be integrated with other applications or products (e.g., the action handler devices 308 of FIG. 3, the BMC Atrium Orchestrator, a Microsoft Exchange Server, etc.), view a document (e.g., an instruction or user manual, an office memo, etc.), etc. It is understood that the above are merely a few illustrative examples to which the disclosed subject matter is not limited.

In some embodiments, one or more of the actions 167 may be associated with a specific PoI (e.g., actions for Conference Room 101, etc.). In such an embodiment, those PoI specific actions may only be available or valid for that particular associated PoI 166. Conversely, in another embodiment, one or more actions may be associated with a type or sub-type of PoIs (e.g., "print a document" may be associated with all printers, "reserve the room" may be associated with all conference rooms, etc.). In such an embodiment, the type-specific actions 166 may be available or valid for PoIs 166 of that associated type or sub-type. In yet another embodiment, other action grouping or associations may be employed (e.g., a set of actions 167 valid for all PoIs in the Virgil, Texas office, a set of actions valid for all IT employees, etc.). It is understood that the above are merely a few illustrative examples to which the disclosed subject matter is not limited.

In the illustrated embodiment, the map and PoI information 162 is transmitted for the administrator device 108 to the map management computing system or device 104, and more specifically to the map and PoI manager 140. In such an embodiment, the map and PoI manager 140 may be configured to enter the map or PoI information 162 supplied by the administrator device 108 into the map storage 180. In various embodiments, this may include re-formatting the map or PoI information 162 for storage as the maps 164 and PoIs 166. Likewise, in the illustrated embodiment, the map and PoI manager 140 may be configured to retrieve maps 164 and PoIs 166 requested by the administrator device 108 from the storage device 106 and supply the resultant map or PoI information 162 to the administrator device 108. In such an embodiment, an administrator 191 may edit, delete, or update various aspects of existing maps 164 and PoIs 166. However, in another embodiment, this map or PoI information 162 may be communicated directly between the storage system 106 and the administrator device 108.

In the illustrated embodiment, the system 100 may include a storage computing system or device 106. In various embodiments, the storage device 106 may include a computing device, such as, for example, a desktop, workstation, a server, a blade server, and other appropriate computers, etc. or a virtual machine or virtual computing device thereof. In various embodiments, the storage device 106 may include hardware and/or software components 183 analogous to those described above in reference to user device 102. In some embodiments, the storage system 106 may include a plurality of computing devices.

In various embodiments, the storage system 106 may include one or more storage systems or data bases 180 and 182. In some embodiments, the storage system 106 may include a map and PoI storage or database 180. In such an embodiment, the map storage 180 may store one or more maps 164 and one or more PoIs 166, as described above.

In some embodiments, the storage system 106 may include a PoI state storage or database 182. In such an embodiment, the PoI state storage 182 may include one or more PoI states 168. In various embodiments, each stored PoI states 168 may be associated with respective PoIs 166. In one embodiment, the PoI data structures 166 may be associated with or include a "state" property or field 168 that indicates the status or usability of the associated PoI 166, as described above. In one embodiment, the PoI 166 may inherit one or more acceptable states based on the PoI's type. In another embodiment, the administrator 191 may set or define a list of possible states the PoI 166 may be in. In the illustrated embodiment, the PoI states 168 include the actual state of the PoI 166 at a given moment. In such an embodiment, the application 118 may display the current state of a given PoI 156 on the annotated map 128, as described below.

In the illustrated embodiment, the system 100 may include a map management (MM) computing system or device 104. In various embodiments, the MM device 104 may include a computing device, such as, for example, a desktop, workstation, a server, a blade server, and other appropriate computers, etc. or a virtual machine or virtual computing device thereof. In various embodiments, the MM device 104 may include hardware and/or software components 133 analogous to those described above in reference to user device 102. In some embodiments, the MM system 104 may include a plurality of computing devices.

In one embodiment, the MM device 104 may include a map selector 142. In such an embodiment, the map selector 142 may be configured to receive location information 150 from the user device 102. In one embodiment, the user device 102 may supply or transmit the current location of the user device 102 periodically or when a triggering event occurs (e.g., in response to a user 190 request for a map 154, entering a predefined location, such as, one of the company's offices, etc.). In another embodiment, the user device 102 may supply or transmit a request for a map 154 of a specific location 150. In such an embodiment, the user 190 may wish to pre-load the user device 102 with one or more maps 154 of places the user 190 is expecting to travel to; although, it is understood that the above is merely one illustrative example to which the disclosed subject matter is not limited. As described above, in various embodiments, this location information 150 may include a list of GPS coordinates or other location coordinates or information.

In some embodiments, the user device 102 or application 118 may have received one or more triggering location 121. In such an embodiment, when the user device 102 comes within a predefined range (e.g., 500 meters, 10 feet, etc.) or within an area defined by the triggering location 121, the application 118 or user device 102 may transmits its location information 150 or a map request that includes the location information 150. In some embodiments, the triggering locations 121 may include a list of GPS coordinates supplied be the MM device 104. It is understood that the above is merely one illustrative example to which the disclosed subject matter is not limited.

In some embodiments, the map selector 142 may be configured to select one or more maps 164 that are deemed relevant to the provided location information 150. In one embodiment, the map selector 142 may be configured to pick or select a map 164 that includes or bounds the provided location information 150. For example, if the user device 102 is on the third floor of a building, the map selector 142 may select the floor map 164 of the third floor of that building. In another embodiment, the map selector 142 may be configured to select one or maps near (as defined by a predefined set of criteria or rules) to the supplied location information 150. For example, if the user device 102 is on the third floor of a building, the map selector 142 may select the floor maps 164 of the second, third, and fourth floors of that building. In yet another embodiment, the map selector 142 may be configured to remember a history of what maps 164, etc. have previously been presented to the user device 102. In various embodiments, the map selector 142 may be configured to take into account user 190 actions or predicted user 190 actions when selecting maps 164. For example, if the user device 102 is on the third floor of a building, and moving towards the elevators, the map selector 142 may select the floor maps 164 of the second and fourth floors of that building. It is understood that the above are merely a few illustrative examples to which the disclosed subject matter is not limited.

In various embodiments, the map selector 142 may be configured to retrieve any PoI 166 associated with the selected map 154. In some embodiments, the map selector 142 may be configured to filter or only select a portion of the PoIs 166 associated with the selected map 154, as described below. In one embodiment, the map selector 142 may be configured to retrieve any metadata or properties associated with the selected map 154 and the selected PoIs 166. In the illustrated embodiment, this metadata includes the PoI actions 167 and the PoI states 168. It is understood that the above is merely one illustrative example to which the disclosed subject matter is not limited.

In such an embodiment, the map selector 142 may be configured to transmit the selected map 154, the associated or selected PoIs 156, and the associated PoI metadata 159 to the user device 102. In various embodiments, this information 154, 156, and/or 159 and other communications of system 100 may be transmitted via Hypertext Transfer Protocol (HTTP), Hypertext Transfer Protocol Secure (HTTPS), or another communications protocol.

In the illustrated embodiment, the application 118 of the user device 102 may include a map annotator 122. In one such an embodiment, the map annotator 122 may be configured to take the selected map 154 and annotate it with the selected PoIs 156 and the PoI metadata (e.g., type, state, actions, etc.). In one embodiment, the map annotator 122 may generate or produce the annotated map 128. In various embodiments, this annotated map 128 may be similar to the map 200 of FIG. 2.

In the illustrated embodiment, the application 118 may include a map viewer 124. In such an embodiment, the map viewer 124 may be configured to display the annotated map 128 to the user 190. As described above, in various embodiments, the map viewer 124 may be configured to allow the user 190 to select various PoIs 156, view the state information or metadata associated with the PoIs 156, zoom in or out of the annotated map 128, display a route between two or more locations, select an action, etc. It is understood that the above are merely a few illustrative examples to which the disclosed subject matter is not limited.

In the illustrated embodiment, the map viewer 124 may include a filter or search mechanism 125. In such an embodiment, the user 190 may be able to limit the PoIs 156 displayed by the map viewer 124 or included within the annotated map 128 using a set of criteria supplied or selected by the user 190. For example, in one embodiment, the user 190 may only wish to see PoIs of type "printer". In such an embodiment, any PoIs not of type "printer" may be removed from the annotated map 128 or simply not displayed by the map viewer 124. In another embodiment, the filter 125 may select or filter PoIs 156 based on other properties or associated metadata 159 (e.g., free conference rooms, working copiers, PoIs associated with the Finance department, PoIs with a "red" state, etc.). It is understood that the above are merely a few illustrative examples to which the disclosed subject matter is not limited.

In the illustrated embodiment, the map viewer 124 may include a router or path generating mechanism or component 123. In such an embodiment, the router 123 may be configured to generate or determine a route between two or more locations. As described above, in one embodiment, the router 123 may determine a path between the current location of the user device 102 and a selected or desired PoI 156 (e.g., scanner 222 of FIG. 2, etc.). In some embodiments, this routine or path may be graphical and displayed on the annotated map 128. In another embodiment, the path may be described in text, graphics, audio directions, a combination thereof, or other forms. It is understood that the above are merely a few illustrative examples to which the disclosed subject matter is not limited.

In various embodiments, the MM device 104 may include a PoI state manager 144. In one embodiment, the PoI state manager 144 may be configured to maintain the state information 168 associated with each PoI 166. In such an embodiment, the PoI state manager 144 may receive state information from a plurality of sources, such as, for example the PoI devices (not illustrated), various user devices 102, or administer devices 108, etc. In one embodiment, when a printer PoI detects a paper jam, it may be configured to send a message (e.g., email, tweet, HTTP message, etc.) to the PoI state manager 144 or a server to which the PoI state manager 144 subscribes (e.g., a Rich Site Summary or Really Simple Syndication (RSS) feed, etc.). The PoI state manager 144 may then edit or update the PoI state 168 associated with the printer PoI to reflect the paper jam (e.g., a state of "paper jam", "unavailable", etc.).

In such an embodiment, as the state of a selected PoI 156 changes or at predefined periodic intervals or upon a request from the user device 102, the PoI state manager 144 may inform the application 118 of the new or current state. In the illustrated embodiment, this is shown as a change in the PoI metadata 159.

In some embodiments, the system 100 may include PoI transient data (TD) 155. In such an embodiment, the PoI metadata 159 may include relatively or substantially static information (e.g., a list of actions, an associated file, etc.), and the PoI transient data 155 may include relatively or substantially dynamic or changing information (e.g., state information, etc.). In some embodiments, the PoI MD 159 may include the PoI TD 155. It is understood that the above are merely a few illustrative examples to which the disclosed subject matter is not limited.

In another embodiment, the application 118 in response to receiving the selected PoIs 156 may subscribe to a feed to other publisher source that broadcasts changed PoI state information. In various embodiments, the PoI state manager 144 and the application 118 may be configured to partake in a publish-subscribe model of information distribution. It is understood that the above are merely a few illustrative examples to which the disclosed subject matter is not limited.

In various embodiments, once the application 118 has been notified of a change in state or other metadata 159 of a PoI 156, a new annotated map 128 may be generated. In another embodiment, the map viewer 124 may simply change the way the annotated map 128 is displayed (e.g., a new icon or indicator may be overlaid onto the map 128, etc.). It is understood that the above are merely a few illustrative examples to which the disclosed subject matter is not limited.

As described above, in various embodiments, a PoI 156 may be associated with one or more actions 167, although some PoIs 156 may be associated with no actions 167. In the illustrated embodiment, the user 190 may request that an action 167 associated with the PoI 156 occur or has occurred. As described above, actions 167 may be broadly categorized as automatic or manual, although, it is understood that the above is merely one illustrative example to which the disclosed subject matter is not limited.

In one embodiment, the application 118 may include a PoI action responder 126. In various embodiments, the PoI action responder 126 may be configured to execute or request the execution of the steps or process defined by the selected action 167. In one embodiment, once the user 190 selects or takes an action 167, the PoI Action responder 126 may determine if the action 167 may be executed locally (by the user device 102). For example, a user 190 may wish to view a file, or place a telephone call, send an email, etc. If the information needed to execute the action 167 is available locally or may be obtained via local resources (hardware or software), the PoI action responder 126 may execute or perform the requested action. For example, the requested file may be included in the PoI metadata 159 or may be obtainable via an HTTP request, the user device 102 may include a phone and the desired number may be included in the PoI metadata 159, likewise when sending an email, etc.

Conversely, in some embodiments, the desired action 167 may not be able to be performed by the user device 102. In such an embodiment, the PoI action responder 126 may transmit a PoI action request 158 to the MM device 104 or other device, as described below, in reference to FIG. 3. In some embodiments, the action 167 may be partially be performed locally (by the user device 102) and partially performed remotely (e.g., by the MM device 104). For example, an action 167 may include sending an email and changing the state or status of the associated PoI. In such an embodiment, the portion of the action 167 that may be performed locally may be executed or processed by the PoI action responder 144 and the remote portion may be executed by a remote device.

In the illustrated embodiment, the MM device 104 may include a PoI action manager 146. In such an embodiment, the PoI action manager may be configured to execute or process a PoI action request 158 from a user device 102. In various embodiments, the PoI action manager 146 may be configured to perform the request action 167 (or portion thereof) itself, or to request that another device perform the action or part thereof.

In one embodiment, the PoI action manager 146 may be configured to change the state of the PoI 156 associated with the action 168. For example, the action 167 may include that the user 190 has cleared the paper jam in the printer, and the requested action 158 may be to change the state or status of the printer PoI 156 to reflect that this manual portion of the action 167 has been performed. In some embodiments, the PoI action manger 146 may work with or communicate with the PoI state manager 144 to perform such an action.

As described above, in such an embodiment, once the PoI's state 168 has changed the PoI metadata 159 may be updated or re-sent to the user device 102. In various embodiments, the PoI transient data 155 may be updated or re-sent to the user device 102. It is understood that the above is merely one illustrative example to which the disclosed subject matter is not limited.

Figure 3:
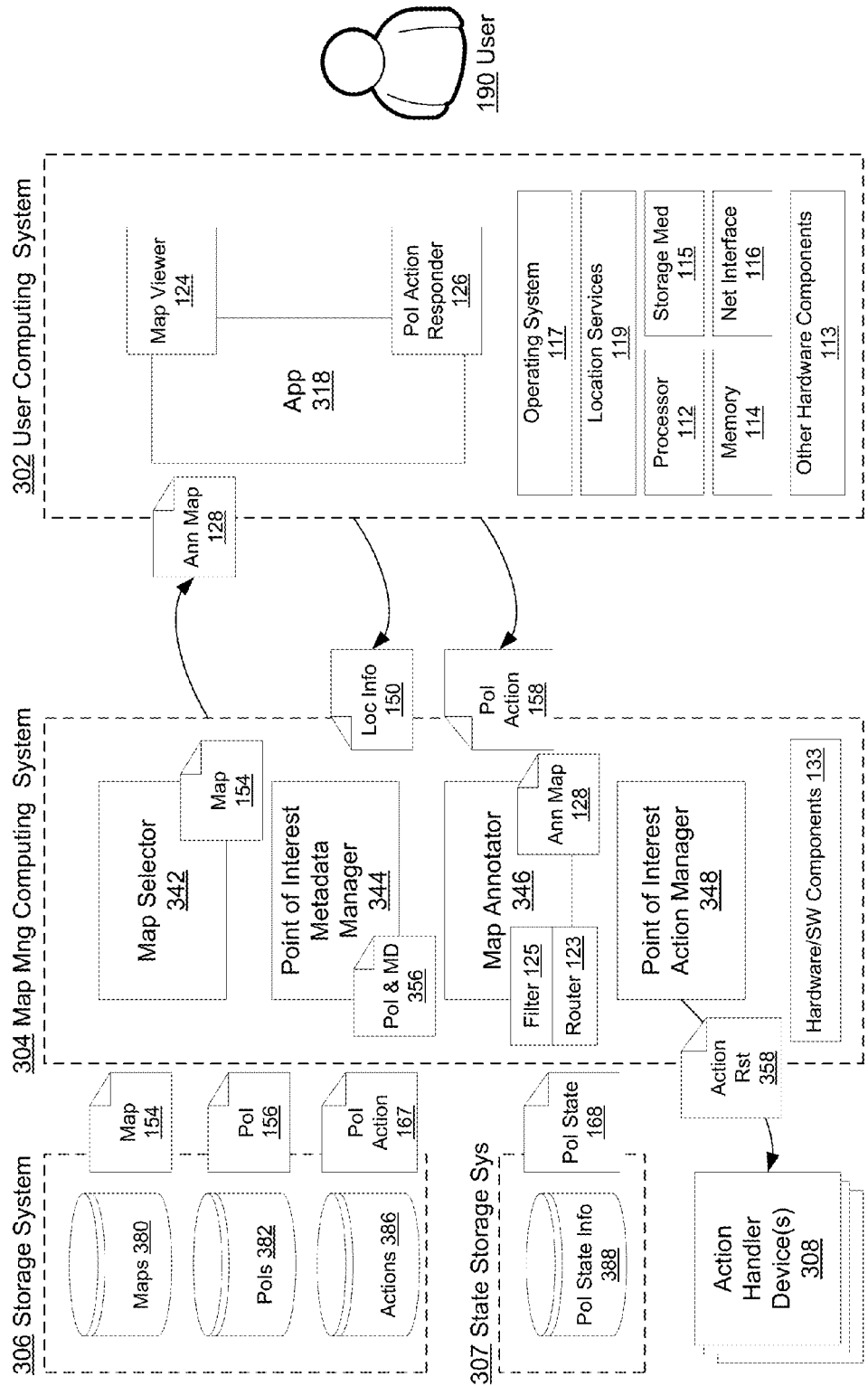
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a user computing system or device 302, a map or asset management computing system or device 304, one or more storage computing devices or systems 306, and a state storage system 307. In some embodiments, the system 300 may also include a one or more action handler devices 308.

In the illustrated embodiment, the system 300 differs in a number of ways from the system 100 of FIG. 1. It is understood that the system 300 is merely one illustrative example to which the disclosed subject matter is not limited. Various embodiments of the disclosed subject matter exist in which one or more of the differences between system 100 and system 300 may be included in the respective embodiment's system.

In one embodiment, the user device 302 may include an application 318 similar to the application 118 of FIG. 1. However, in the illustrated embodiment, the application 318 may not be responsible or configured to generate or create the annotated map 128. In such an embodiment, the generation of the annotated map 128 may be done by the MM device 304.

In such an embodiment, the MM device 304 may include a map selector 342, a PoI metadata manager 344, and a map annotator 348. In various embodiments, the map selector 342 may be configured to select the map 154, as described above. Further, in the illustrated embodiment, the map selector 342 may be configured provide the selected map 154 to the map annotator 346. In some embodiments, the PoI metadata manager 344 may be configured to collect the PoIs 156 and PoI metadata (e.g., PoI state 168, PoI actions 167, PoI type, etc.) for the PoIs 356 associated with the selected map 154. Further, in the illustrated embodiment, the PoI metadata manager 344 may be configured provide the selected PoIs and their respective metadata 356 to the map annotator 346.

In the illustrated embodiment, the map annotator 346 may be configured to take the selected map 154, the selected PoIs and their metadata 356 and generate or create the annotated map 128. In such an embodiment, the computing or processing load used by the user device 302 may be reduced as the generation of the annotated map 128 is now done by the MM device 304. It is understood that the above is merely one illustrative example to which the disclosed subject matter is not limited.

In the illustrated embodiment, this annotated map 128 may then be supplied or transmitted to the application 318. It may then be displayed by the map viewer 124. In some embodiments, the annotated map 128 may include a graphical portion (e.g., the floor map 154, icons or indicators for the PoIs 156) and a data structure portion (e.g., PoI actions 167, PoI state information 168, etc.). In such an embodiment, the map viewer 124 may be configured to overlay various information or GUI elements (e.g., an icon color, a menu, etc.) on the graphics portion of the annotated map 128, based upon the data structure portion of the annotated map 128. In such an embodiment, as the data structure portion of the annotated map 128 changes (e.g., a state change of a PoI, etc.) that map annotator 346 may be configured to only transmit to the user device 302 the changed information or the change data structure portion. In various embodiments, an initial annotated map 128 may be edited into a current annotated map 128 by the map viewer in response to changes in PoI metadata. It is understood that the above is merely one illustrative example to which the disclosed subject matter is not limited.

In the illustrated embodiment, the filter mechanism 125 and/or the router mechanism 123 may be included by the map annotator 346. In such an embodiment, the user device 302 may transmit desired inputs for these mechanisms (e.g., the filter criteria, the router locations, etc.) via the location information 150 and the PoI actions 158, respectively. It is understood that the above is merely one illustrative example to which the disclosed subject matter is not limited.

In the illustrated embodiment, the system 300 may include a storage system 306. In the illustrated embodiment, the storage device 306 may include separate data bases or stores for the maps 154 (stored in the map storage 380), the PoIs 156 (stored in the PoI storage 382), and the actions 167 (stored in the action storage 386). Further, in the illustrated embodiment, the PoI state information 368 may be stored via a spate device, state storage system 307. In other embodiments, the map storage 380, PoI storage 382, and PoI action 386 may be store together or separately in different devices, or database systems. It is understood that the above are merely a few illustrative examples to which the disclosed subject matter is not limited.

As described above, in various embodiments, the system 300 may include or be in communication with one or more action handler devices or services 308. In various embodiments, these action handler service or devices 308 may be configured to perform various actions requested by the PoI action manager 348. In one embodiment, the action handler devices 308 may be external to the system 300.

In the illustrated embodiment, the MM device 304 may include PoI action manager 348. As described above, the PoI action manager 348 may be configured to receive a PoI action request 158 from the application 318. As with the PoI action responder 126 of the application 318, the PoI action manager 348 may be configured to determine if the requested PoI action 158 may be performed by the MM device 304. If the PoI action 158 may be performed, in whole or part, by the MM device 304, the PoI action manager 348 may be configured to execute or perform the portions of the requested PoI action 158 that may be performed locally by the MM device 304.

However, if the PoI action 158 may not be performed, in whole or part, by the MM device 304, the PoI action manager 348 may be configured to determine an action handler device 308 that is configured to perform the requested PoI action 158 or a portion thereof. In various embodiments, the PoI action manager 348 may maintain a list or table of action handler devices 308 associated with various actions 167 or groups of actions 167. In some embodiments, this list may be defined or managed by an administrator.

In various embodiments, once the appropriate action handler device or service 308 has been determined, the PoI action manager 348 may be configured to transmit an action request 358 to the determined appropriate or responsible action handler device 308. In some embodiments, the action handler device 308 may be configured to transmit an action response or acknowledgement (not shown) to notify that PoI action manager 348 that the action has been performed, failed, or was accepted for processing. In such an embodiment, the PoI action manager 348 may then take appropriate steps (as defined by the PoI action 158 or an error handling technique, etc.) in response to the action response.

For example, in one embodiment, the action 158 may include reserving a conference room (a PoI 156) for a certain time and date, and sending out email invitations to a group of people or users 190 to attend a meeting in the conference room (PoI 156). In such an embodiment, the PoI action manager 348 may determine that the help of an action handler device 308 (e.g., a calendaring system, an email gateway, etc.) is needed to complete the action 158. The PoI action manager 348 may then send out one or more action requests 358 to one or more action handler devices 308. For example a first action request 358 may be transmitted to a room reservation system action handler device asking to reserve the conference room for the given time and date. If the first action request succeeds, a second action request may be send to an email gateway or server to send out emails or calendar invitations to the desired participant users. If that is also successful, a message may be transmitted to the user device 302 that the PoI action request 158 was successful. It is understood that the above is merely one illustrative example to which the disclosed subject matter is not limited.

In various embodiments, the PoI metadata manager 344 may be configured to communicate with one or more action handler devices or services 308 in order to update that state or other metadata of various PoIs 156. For example, once the above conference room has been reserved the MM device 304 may not maintain or store the reservation information. As such, the MM device 304 may not know when the given time and date occur, that the conference room PoI's state should be changed to "reserved" (or similar). In such an embodiment, the PoI metadata manager 344 may be configured to request the reservation status of the conference room-type PoIs from the action handler device 308 responsible for room reservations. In various embodiments, this information request may occur periodically. In another embodiment, room reservation system action handler device may be configured to notify the MM device 304 when a conference room is reserved. It is understood that the above is merely one illustrative example to which the disclosed subject matter is not limited.

Figure 4:
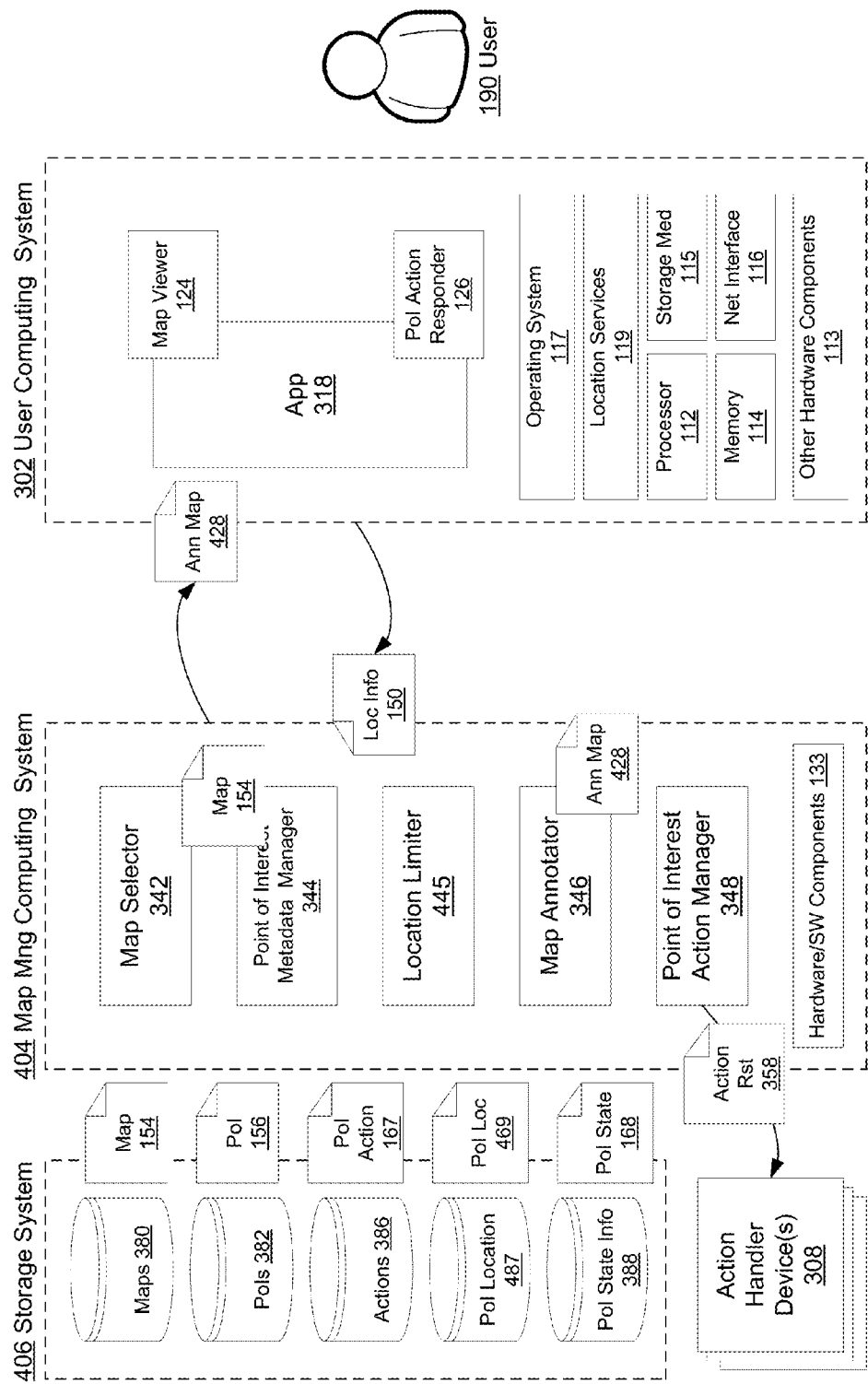
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include a user computing system or device 302, a map or asset management computing system or device 404, and one or more storage computing devices or systems 406. In some embodiments, the system 400 may also include a one or more action handler devices 308.

In the illustrated embodiment, the system 400 differs in a number of ways from the system 100 of FIG. 1 or the system 300 of FIG. 3. It is understood that the system 400 is merely one illustrative example to which the disclosed subject matter is not limited. Various embodiments of the disclosed subject matter exist in which one or more of the differences between systems 100 & 300 and system 400 may be included in the respective embodiment's system.

In the illustrated embodiment, the system 400 may include a unified storage system or device 406. In such an embodiment, the unified storage system 406 may include databases or stores for the maps 154 (via map storage 380), the PoIs 156 (via PoI storage 382), the PoI actions 167 (via PoI action storage 386), the PoI state information 168 (via PoI state information storage 388), and the locations 469 of the PoIs (via the PoI location storage 487). In the illustrated embodiment, the locations 469 of the PoIs may be stored separately versus as part of the PoIs 156 themselves. In various embodiments, other PoI metadata (e.g., types, associated documents, etc.) may be stored separately from the PoIs 156. It is understood that the above is merely one illustrative example to which the disclosed subject matter is not limited.

In the illustrated embodiment, the MM computing system or device 404 may include a location limiter 445. In various embodiments, the location limiter 445 may be configured to limit the PoIs included by the annotated map 428 to PoIs that are within a certain range or distance of the user device 302. For example, in one embodiment, the location limiter 445 may be configured to remote any PoIs 156 form the annotated map 428 or the inputs that are used to generate the annotated map 428, if those PoI locations 469 are greater than 50 feet from the location information 150 provided by the user device 302. In such an embodiment, a user 190 may see more PoIs 156 as they walk through a floor or building, and are not overwhelmed or distracted by PoIs that are not near them. It is understood that the above are merely a few illustrative examples to which the disclosed subject matter is not limited.

In various embodiments, the range may be configurable by the user 190. In such an embodiment, the range may be included by the location information 150. In another embodiment, the range used by the location limiter 445 may be predefined. In some embodiments, the range or distance may take into account the route a user 190 would have to take (e.g., around walls, etc.) between themselves (or the user device 302) and the PoI 158 in question. It is understood that the above are merely a few illustrative examples to which the disclosed subject matter is not limited.

In various embodiments, the annotated map 428 may not include a monolithic or relatively large image that represents an entire floor or area. In such an embodiment, the annotated map 428 may include a plurality of tiles that, when displayed together, comprise the entire floor or area, or a portion thereof. In such an embodiment, the map annotator 346 may stream or transmit more annotated map tiles to the application 318 as the user 190 or user device 304 come with range of the newer tiles. In such an embodiment, the annotated map 428 may be updated piecemeal. In such an embodiment, the location limiter 445 may facilitate the determination of which tiles or portions of the annotated map 426 are to be transmitted and which the map annotator 346 is to refrain from generating and/or transmitting. It is understood that the above are merely a few illustrative examples to which the disclosed subject matter is not limited.

In another embodiment, the annotated map 428 may include all of the PoIs 156 associated with map 154. However, the application 318 may include a location limiter (not shown) or map viewer 124 that may not display or hide the PoIs 156 that are not within a given range. It is understood that the above is merely one illustrative example to which the disclosed subject matter is not limited.

Figure 5:
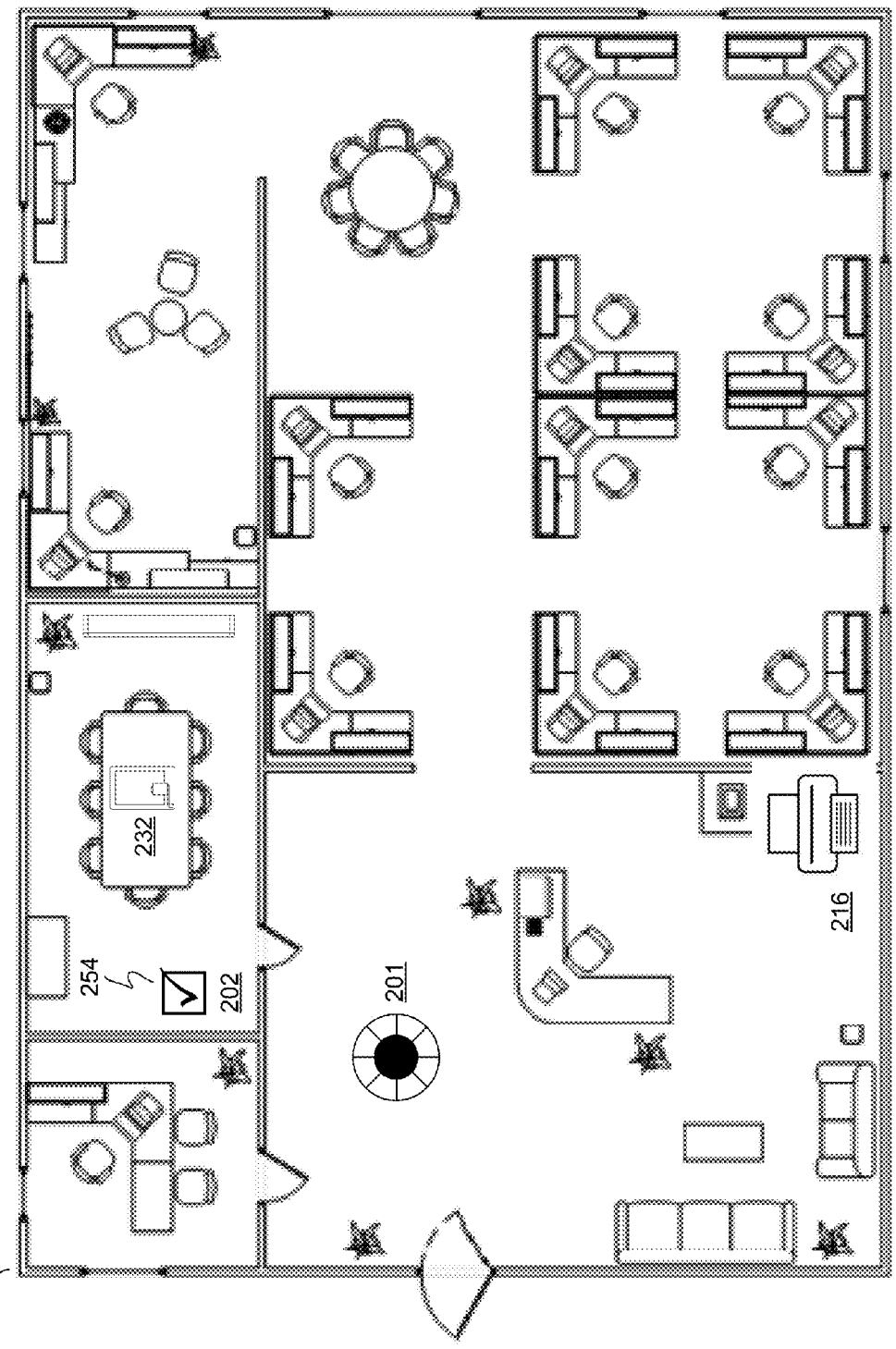
FIG. 5 is a diagram of an example embodiment of an annotated map in accordance with the disclosed subject matter.

FIG. 5 is a diagram of an example embodiment of an annotated map 500 in accordance with the disclosed subject matter. In the illustrated embodiment, the map 500 may include a floor plan or map 290 and one or more points of interest (e.g., printer 216, etc.). It is understood that the above is merely one illustrative example to which the disclosed subject matter is not limited.

In one embodiment, the map 500 may include the floor plan or map 290 similarly to the map 200 of FIG. 2. However, in the illustrated embodiment, a number of PoIs (e.g., printer 214 & 212, desks 424, 244, 246 & 248, etc.) are missing or not displayed. In the illustrated embodiment, a location limiter has taken the location 201 and determined which PoIs are within a given range (e.g., 25 feet, etc.) of the user's location 201.

In various embodiments, only three PoIs (conference room 202, projector 232, and printer 216) are deemed to be within range of user 201 and are included on map 500. Further, in such an embodiment, if the user 201 walks through the office (e.g., towards the wall on the right edge of the floor plan 290), the location limiter may add or cause additional PoIs to be displayed. For example, printer 214, and the desk 242 may be displayed.

Figure 6:
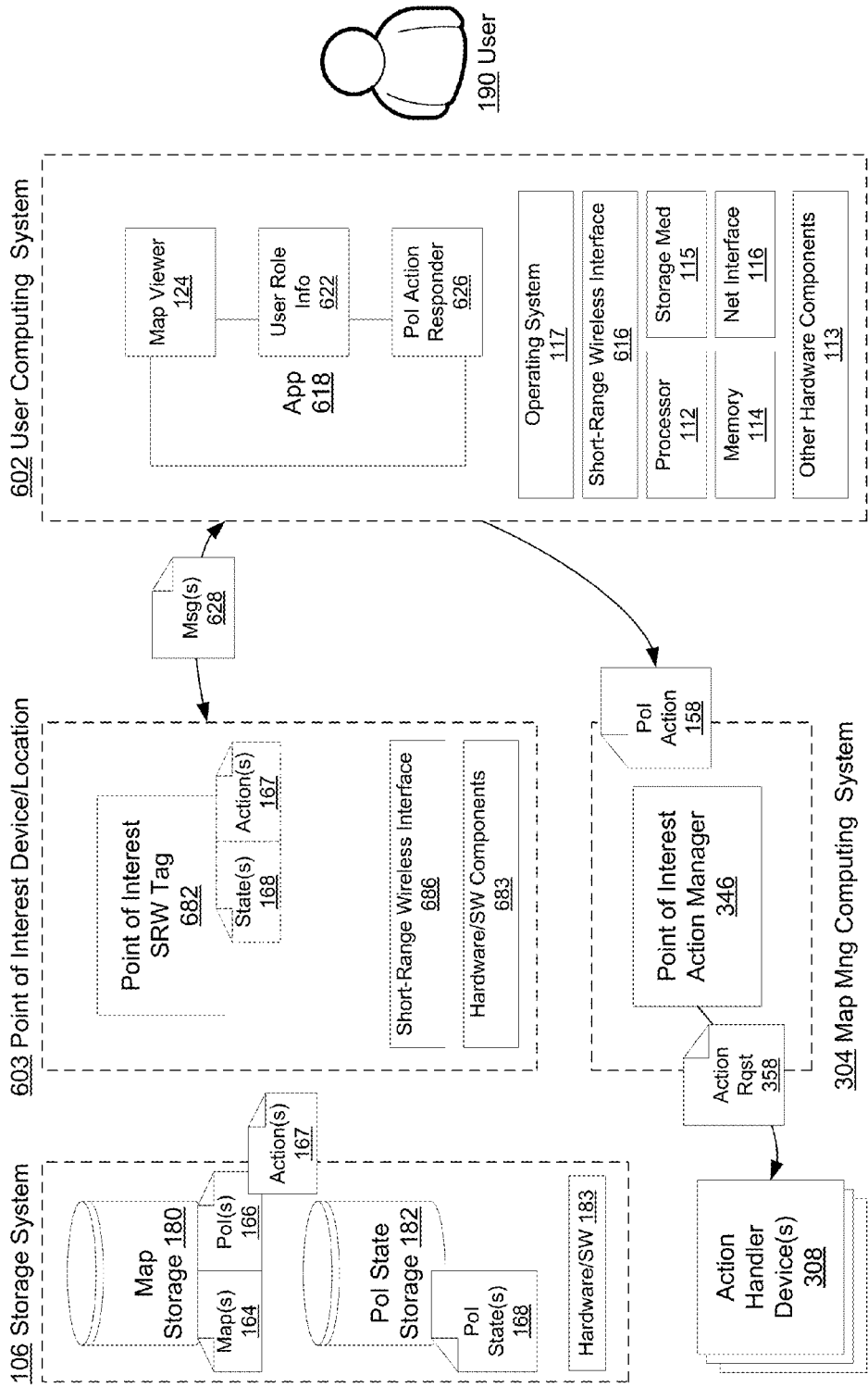
FIG. 6 is a block diagram of an example embodiment of a system in accordance with the disclosed subject matter.

FIG. 6 is a diagram of an example embodiment of a system 600 in accordance with the disclosed subject matter. In the illustrated embodiment, the system 600 may include a user computing system or device 602, a point of interest device and/or location 603, a map management computing system or device 304, and a storage system 106. In some embodiments, the system 600 may also include one or more action handler devices 308.

In various embodiments, the user device 602 may be similar to the user device 102 of FIG. 1. In the illustrated embodiment, the user device 602 may also include a short-range wireless (SRW) interface or communications component 616. In some embodiments, the SRW interface 616 may include an interface to a near field communication (NFC) receiver, transceiver, or tag. In such an embodiment, the SRW interface 616 may communicate at approximately 13.56±1.8 megahertz (MHz) and may be limited to less than 20 centimeters (cm). In some embodiments, the NCF interface 616 may operate with an effective range of approximately 4 cm.

In another embodiment, the SRW interface 616 may include an interface to a radio-frequency identification (RFID) transceiver, receiver, or tag. In such an embodiment, the RFID interface 616 may communicate at a variety of frequencies or ranges of frequencies (e.g., 120-150 kHz, 13.56 MHZ, 433 MHz, 865-868 MHz, 902-928 MHz, 2450-5800 MHz, 3.1-10 GHz, etc.). Likewise, in some embodiments, the RFID interface 616 may communicate at a variety of distances or ranges (e.g., 10 cm, 1 m, 2 m, 1-100 m, less than 200 m, etc.).

In yet another embodiment, the SRW interface 616 may include an interface to a Bluetooth transceiver, receiver, or transmitter. In such an embodiment, the SRW interface 616 may be configured to operate or communicate within the 2400-2480 MHz band. In such an embodiment, the SRW interface 616 may be configured to communicate within one or more ranges (e.g., less than 100 m, less than 10 m, less than 1 m, etc.). It is understood that the above are merely a few illustrative examples of short range wireless communication technologies to which the disclosed subject matter is not limited.

In the illustrated embodiment, the system 600 may include one or more points of interest devices or locations 603. In some embodiments, as described above, the PoI 603 may include a physical device (e.g., a printer, copier, coffee machine, etc.). In such an embodiment, the PoI device 603 may include or have co-located on or near the device (e.g., a circuit attached to a sticker, etc.) that includes the components described below. In another embodiment, the PoI device 603 may include or be integrated with the components described below. In another embodiment, as described above, the PoI 603 may include a location (e.g., a conference room, desk, etc.). In such an embodiment, the PoI location 603 may include or have co-located within or near the location a device (e.g., a circuit attached to a sticker or nameplate, etc.) that includes the components described below.

In various embodiments, the PoI device or location 603 may include a PoI SRW tag 682. In some embodiments, the SRW tag 692 may include more or more memory elements configured to store information. In some embodiments, the PoI SRW tag 682 may include or store information relating to the PoI's 603 state. In various embodiments, the PoI SRW tag 682 may include or store information relating to the actions 167 associated with the PoI device or location 603. In another embodiment, other pieces of information may be stored by the PoI SRW tag 682.

In the illustrated embodiment, the PoI device or location 603 may include a SRW interface 686. In some embodiments, the SRW interface 686 may be similar to the SRW interface 616 of the user device 602. In such an embodiment, the SRW interfaces 616 and 686 may be configured to communicate with one another via one or more message 628. In some embodiments, this communication may be bi-directional. In another embodiment, this communication may be unidirectional. In various embodiments, the nature of communication may depend on the capabilities or settings of the PoI device or location 603.

In various embodiments, in response to the messages 628 the PoI device or location 603 may alter or edit the state or other information 168 stored within the SRW tag 682. For example, in one embodiment, a message 628 from the user device 602 may cause the state 168 to change from "reserved" to "in-use". It is understood that the above is merely one illustrative example to which the disclosed subject matter is not limited.

In another embodiment, in response to the messages 628 the PoI device or location 603 may transmit the state or other information 168 stored within the SRW tag 682 to the user device 602. For example, in one embodiment, a message 628 from the user device 602 may cause the PoI device 603 to transmit the current state 168 or a list of possible or associated actions 167 to the user device 602. It is understood that the above is merely one illustrative example to which the disclosed subject matter is not limited.

In yet another, less preferred embodiment, in response to the messages 628 the PoI device or location 603 may perform or cause to be performed one or more of the actions 167. For example, in one embodiment, a message 628 from the user device 602 may cause the PoI device 603 to transmit a PoI action request 158 to the MM device 604. This PoI action request 158 may be processed by the PoI Action manager 346 of the MM device 304, as described above. It is understood that the above is merely one illustrative example to which the disclosed subject matter is not limited.

In various embodiments, the PoI device or location 603 may include one or more hardware or software components 683 analogous to the hardware components, 112, 113, 114, 115, 116, 117, etc. of the 602 user device as described above. For example, in one embodiment, a network interface (e.g., to a local area network (LAN), WLAN, cellular network, etc.) may be employed to communicate a PoI action request 158 to the MM device 304 or other communications as desired.

In a more preferred embodiment, upon communicating with the SRW interface 686 of the PoI device 603 the user device, the PoI Action Responder 626 of the user device 602 may transmit a PoI action request 158 to the MM device 304. In such an embodiment, this PoI action request 158 may be processed by the PoI Action manager 346 of the MM device 304, as described above.

In various embodiments, an example interaction between the user device 602 and the PoI device 603 may include when an employee enters a conference room PoI, the user 190 may place their cell phone or user device 602 on an NFC tag or device 603. Once the user device 602 has acknowledged the PoI device 603 (via the NFC interface 616), the user device 602 may be configured to transmit a PoI action request 158 that includes a request to change the state of the conference room PoI from "reserved" to "in-use".

In another embodiment, the PoI action request 158 may include a request to indicate that the user 190 of the user device 602 in now attending the meeting. In such an embodiment, the user device 602 may include one or more pieces of user role information 622. In such an embodiment, the user role information 622 may include the name or username of the user 190. In another embodiment, the user role information 622 may include a group to which the user 190 belongs (e.g., administrator, IT group, etc.), a title associated with the user 190, or other identifying information about or associated with the user 190. In various embodiments, the PoI device 603 may be configured to filter or restrict messages or information (e.g., actions, etc.) communicated to the user device 602 based upon the user role information 622. It is understood that the above are merely a few illustrative examples to which the disclosed subject matter is not limited.

In another example embodiment, an IT support person may enter a room to fix a projector PoI. In such an embodiment, the IT person may place their user device 602 on the PoI device 603 or otherwise cause the SRW interface 616 to communicate with the SRW interface 686. In one embodiment, the communication or messages 626 may cause the application 618 to display a UI element (e.g., a dialog box, etc.) to the user 190. In some embodiments, this may only occur if the user role information 622 indicates that the user 190 of the user device 602 has IT support responsibilities. The UI element may ask the user 190 if a maintenance action is being performed. In such an embodiment, the suggested or requested action 167 may be based upon the state 168 of the PoI device 603. For example, if a printer PoI is jammed, the dialog box may ask if the user 190 has cleared the jam. In one embodiment, the user 190 may manually select that the action 167 has been performed, and a PoI action request 158 may be sent to the MM device 304.

In another embodiment, a second triggering event (e.g., removing the user device 602 from communication with the PoI device 603) may cause a default PoI action request 158 to be sent to the MM device 304. For example, if the PoI device 603 is in an operable or usable state (e.g., no printer jam, etc.) and a user 190 indicates that a maintenance activity or action is being performed, the PoI's state 168 may be changed to "inactive" or "under maintenance". When the user 190 removes their user device 602 from communication with the PoI device 603 (an example of a triggering act or event), the PoI device 603 or, in a preferred embodiment, the user device 602 may initiate a PoI action request 158 that returns the PoI state 168 to an operable or usable state. In some embodiments, the PoI device 603 may be configured to receive state 168 or other information updates via a WLAN or LAN message or communication from the MM device 304. It is understood that the above is merely one illustrative example to which the disclosed subject matter is not limited.

In such an embodiment, the PoI device 603 or the user device 602 may include a finite-state machine (FMS) or similar set of rules that allows the PoI device 603 to proceed through a series of states 168 or possible actions 167 based upon a set of triggering events (e.g., starting the SRW communication, ending the SRW communication, received messages 628, etc.). In such an embodiment, the FSM may be stored in the same memory hardware component 683 that stores the state 168 and action 167 information. In another embodiment, the FSM may be delivered to the user device 602 in response to an initial PoI action request 158. It is understood that the above are merely a few illustrative examples to which the disclosed subject matter is not limited.

While the above examples have described the PoI device 603 as having limited computational ability and the user device 602 as having a greater computational ability (e.g., initiating the PoI action requests 158, display UI elements, etc.) this may not be true in all embodiments. In some embodiments, the PoI device 603 may have the greater computational ability (e.g., initiating the PoI action requests 158, display UI elements, etc.) and the user device 602 the lesser computational ability, relative to one another. In some such embodiments, user device 602 may not include the application 618, OS 117, or other hardware components besides the SRW interface 616 (e.g., processor 112, a display, a storage medium 115, etc.).

In one such example embodiment, a cleaning employee's user device 602 may include a badge, card, or other such device. In such an embodiment, when a cleaning employee 190 enters a toilet/restroom or other location PoI, the cleaning employee 190 may swipe, scan, or otherwise place their user device 602 in brief communication with a PoI device 603 located within the location PoI. In such an embodiment, the initial triggering event (placing the devices 602 & 603 in communication) and the user role information 622 that indicates the user 190 is part of the cleaning staff, may cause the location PoI's state 168 to change to "being cleaned". Likewise, when the cleaning employee leaves, against swiping their user device 602 or ending the SRW communication and causing a second triggering event, the location PoI's state 168 to change to "available". In such an embodiment, the PoI device 603 may be responsible or configured to send the PoI action request 158 to change the state 168.

In such an embodiment, the change in state of the associated PoIs (e.g., the toilet "being cleaned", the projector "under maintenance", etc.) may be communicated to the user device 602 or similar user devices of other users (not shown) via an updated annotated map or updated PoI metadata, as described above. In such an embodiment, an engineering employee may be able to see that the toilet closest to them is "being cleaned" and decide to use another functional toilet instead. It is understood that the above is merely one illustrative example to which the disclosed subject matter is not limited.

In some embodiments, the SRW interface 616 may be able to act as a secondary or supplemental location aid. In one such embodiment, if an employee finds that a PoI is "unavailable", the application 602 may communicate with other PoIs within the range of the SRW protocol employed by the SRW interface 616 to determine if any other PoI devices 603 are in an "available" state and match the same type as the "unavailable" PoI. In such an embodiment, the application 612 may prompt or display a UI element to the user 190 before making this discovery attempt.

In another embodiment, the PoI devices 603 in communication with the SRW interface 616 may be used by a location limiter (e.g., similar to the location limiter 445 of FIG. 4, etc.) to determine what PoIs to display on the annotated map. In such an embodiment, the user device 602 may include a location limiter (not shown). It is understood that the above is merely one illustrative example to which the disclosed subject matter is not limited.

In various embodiments, the MM device 304 may be configured to collect usage statistics or information regarding the SRW communication between various PoI device 603 and user device 602. For example, in one embodiment, a count may be maintained by the MM device 304 every time a user device 602 and a PoI device 603 initiate communication. In various embodiments, this information may be transmitted to the MM device 304 by either the user device 602 or the PoI device 603. Likewise, the length of an interaction or communication session, the user roles 622 of the users 190, the actions 167 requested or communicated to the user devices 602, etc. may also be monitored and recorded. It is understood that the above are merely a few illustrative examples to which the disclosed subject matter is not limited. In such an embodiment, the statistical information may be used by an administrator or other user to determine what PoIs are being used and how they are being used.

Figure 7:
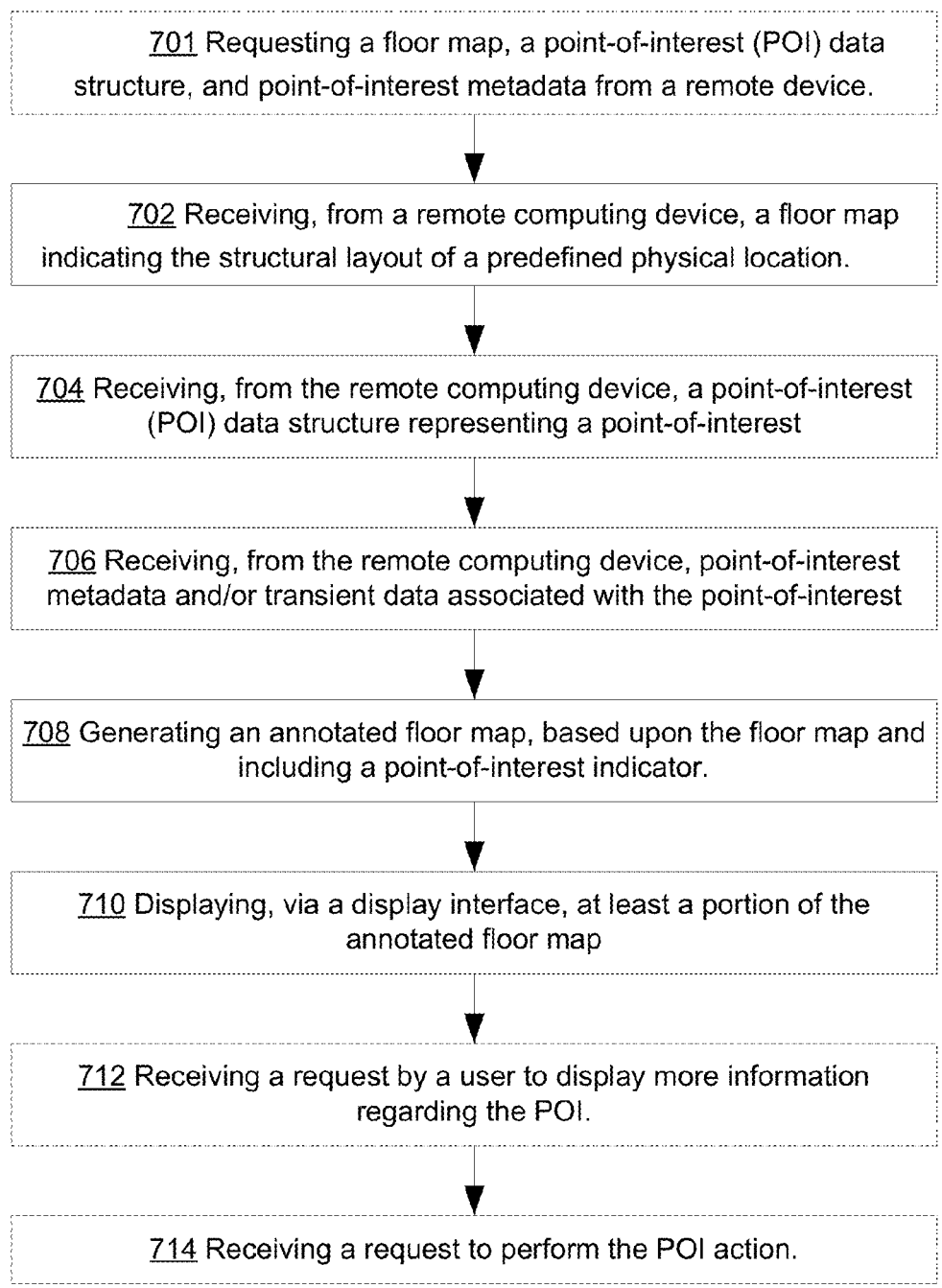
FIG. 7 is a flowchart of an example embodiment of a technique in accordance with the disclosed subject matter.

FIG. 7 is a flowchart of an example embodiment of a technique 700 in accordance with the disclosed subject matter. In various embodiments, the technique 700 may be used or produced by the systems such as those of FIG. 1, 3, 4, or 6. Furthermore, portions of technique 700 may be use or produce maps such as that of FIG. 2, 4, or 5. Although, it is understood that the above are merely a few illustrative examples to which the disclosed subject matter is not limited. It is understood that the disclosed subject matter is not limited to the ordering of or number of actions illustrated by technique 700.

Block 701 illustrates that, in one embodiment, a floor map, a point-of-interest (POI) data structure, and/or point-of-interest metadata may be requested, as described above. In some embodiments, these items may be requested from a remote computing device, as described above. In various embodiments, requesting may include or occur in response to detecting that an apparatus or user device has physically entered a triggering location, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Block 702 illustrates that, in one embodiment, a floor map indicating the structural layout of a predefined physical location may be received, as described above. In some embodiments, the floor map may be received from a remote computing device, as described above. In one embodiment, receiving the floor map may include receiving an initial annotated floor map from the remote computing device, wherein the annotated floor map includes the floor map and the POI data structure, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Block 704 illustrates that, in one embodiment, one or more point-of-interest (POI) data structures representing respective points-of-interest may be received, as described above. In some embodiments, the PoIs may be received from a remote computing device, as described above. In one embodiment, receiving the PoIs may include receiving an initial annotated floor map from the remote computing device, wherein the annotated floor map includes the floor amp and the POI data structure, as described above.

In some embodiments, the point-of-interest data structure may include a location of an associated POI that is associated with the point-of-interest, as described above. In one such embodiment, the PoI may be associated with a physical location, as described above. In another embodiment, the PoI may be associated with a physical apparatus or device, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Block 706 illustrates that, in one embodiment, point-of-interest metadata associated with the point-of-interest may be received, as described above. In some embodiments, transient data associated with the point-of-interest may be received either a part of the metadata or separately, as described above. In some embodiments, the PoIs may be received from a remote computing device, as described above. In one embodiment, the point-of-interest metadata includes a point-of-interest type indicating a type of the associated POI, and a point-of-interest status indicating the status of the associated POI, as described above. In another embodiment, the PoI metadata may include at least one POI action that may be performed in relation to the POI, as described above. In such an embodiment, the POI action may include an action that changes a state variable of the associated PoI, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Block 708 illustrates that, in one embodiment, an annotated floor map may be generated based, at least in part, upon the floor map, as described above. In one embodiment, the annotated floor map may include a point-of-interest indicator, as described above. In one such embodiment, the point-of-interest indicator may be placed on the floor map at the location of an associated point of interest and may indicate the type of the associated point of interest and/or at least part of the status of the associated point of interest, as described above. In some embodiments in which an initial annotated map has been received, generating an annotated floor map may include altering the initial annotated map based upon the POI metadata, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Block 710 illustrates that, in one embodiment, at least a portion of the annotated floor map may be displayed, as described above. In some embodiments, this portion may be displayed via a display interface of a user device, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Block 712 illustrates that, in one embodiment, a request by a user to display more information regarding the POI may be received, as described above. In various embodiments, in response to this request, additional POI metadata may be requested, for example, from the remote computing device, as described above. In some embodiments, once the additional POI metadata has been received, the additional POI metadata may be displayed to the user, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Block 714 illustrates that, in one embodiment, a request to perform a POI action may be received, as described above. In one embodiment, in response to this request it may be determined if the POI action may and/or must be performed either wholly locally or requires the assistance of the remote computing device, as described above. In such an embodiment, if the performance of the POI action requires assistance of the remote computing device, a POI action request message may be transmitted, to the remote computing device, as described above. In one such embodiment, the request may include the message to perform at least a portion of the POI action, as described above.

In some embodiments, receiving a request to perform a PoI action may include establishing a communication via a near field communication or SRW protocol with a PoI, as described above. In such an embodiment, requesting may also include requesting the performance of the POI action in response to establishment of communication with the POI via the near field communication or SRW protocol, as described above. In various embodiments, one or more of the action(s) illustrated by this Block may be performed by the apparatuses or systems of FIG. 1, 3, 4, or 6, the applications 118, 318, and/or 618 of FIG. 1, 3, 4, or 6, as described above.

Figure 8:
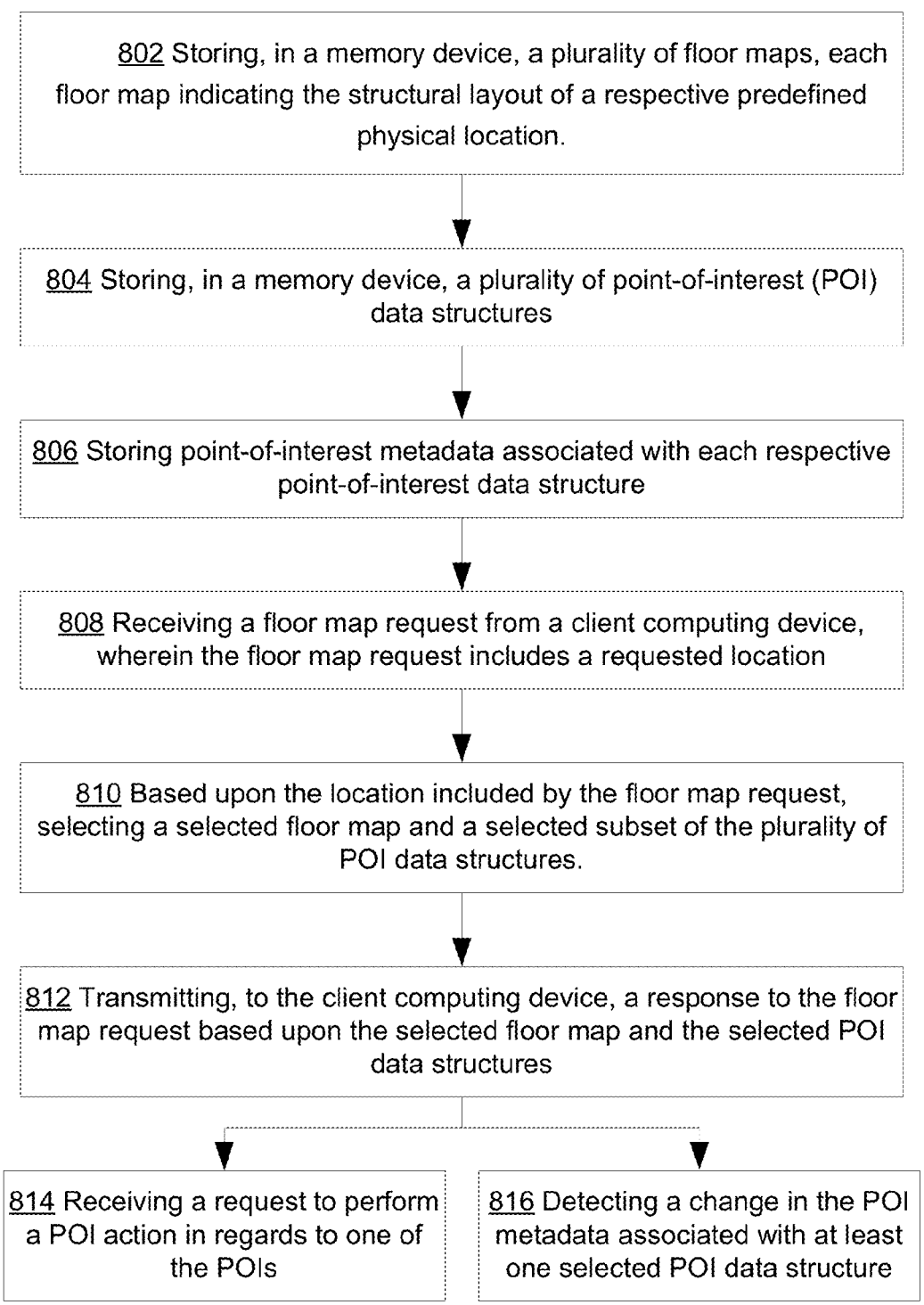
FIG. 8 is a flowchart of an example embodiment of a technique in accordance with the disclosed subject matter.

FIG. 8 is a flowchart of an example embodiment of a technique 800 in accordance with the disclosed subject matter. In various embodiments, the technique 800 may be used or produced by the systems such as those of FIG. 1, 3, 4, or 6. Furthermore, portions of technique 800 may be use or produce maps such as that of FIG. 2, 4, or 5. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, a plurality of floor maps may be stored, as described above. In various embodiments, storing may include the use of a memory device, as described above. In some embodiments, each floor map may indicate the structural layout of a respective predefined physical location, as described above. In various embodiments, one or more of the action(s) illustrated by this Block may be performed by the apparatuses or systems of FIG. 1, 3, 4, or 6, the storage systems 106, 306, and/or 406 of FIG. 1, 3, 4, or 6, as described above.

Block 804 illustrates that, in one embodiment, a plurality of point-of-interest (POI) data structures may be stored, as described above. In various embodiments, each point-of-interest data structure may include a physical location of an associated POI that is associated with the respective point-of-interest data structure, as described above. In some embodiments, each POI data structure may be associated with at least one POI metadata that includes a point-of-interest type indicating a type of the respective associated POI, and a point-of-interest status indicating the status of the respective associated POI, as described above. In various embodiments, one or more of the action(s) illustrated by this Block may be performed by the apparatuses or systems of FIG. 1, 3, 4, or 6, the storage systems 106, 306, 307, and/or 406 of FIG. 1, 3, 4, or 6, as described above.

Block 806 illustrates that, in one embodiment, point-of-interest metadata associated with each respective point-of-interest data structure may be stored, as described above. In various embodiments, each point-of-interest metadata may include a point-of-interest type indicating a type of the respective associated POI, and a point-of-interest status indicating the status of the respective associated POI, as described above. In various embodiments, one or more of the action(s) illustrated by this Block may be performed by the apparatuses or systems of FIG. 1, 3, 4, or 6, the storage systems 106, 306, 307, and/or 406 of FIG. 1, 3, 4, or 6, as described above.

Block 808 illustrates that, in one embodiment, a floor map request may be received from a client computing device, as described above. In some embodiments, the floor map request may include a requested location, as described above. In one embodiment, the floor map request may include one or more filtering criteria, as described above. In various embodiments, one or more of the action(s) illustrated by this Block may be performed by the apparatuses or systems of FIG. 1, 3, 4, or 6, the map management systems 104, 304, and/or 404 of FIG. 1, 3, 4, or 6, as described above.

Block 810 illustrates that, in one embodiment, a selected floor map and/or a selected subset of the plurality of POI data structures may be selected, as described above. In some embodiments, this selection may occur based upon the location included by the floor map request, as described above. In various embodiments, selecting may include determining a subset of the plurality of POI data structures based upon a distance between the requested location and the physical location of an associated POI that is associated with the respective POI data structure, as described above. In yet another embodiment, selecting a selected subset of the plurality of POI data structures may include selecting a POI data structure only if the POI data structure passes the filtering criteria, as described above. In various embodiments, one or more of the action(s) illustrated by this Block may be performed by the apparatuses or systems of FIG. 1, 3, 4, or 6, the map management systems 104, 304, and/or 404 of FIG. 1, 3, 4, or 6, as described above.

Block 812 illustrates that, in one embodiment, a response to the floor map request based upon the selected floor map and the selected POI data structures may be transmitted, as described above. In some embodiments, the response may be transmitted to the client computing device, as described above. In some embodiments, transmitting may include generating an annotated floor map, based upon the selected floor map, as described above. In such an embodiment, the generated annotated floor map may include, for each selected POI data structure, a selected point-of-interest indicator, wherein the point-of-interest indicator is placed on the floor map at a location representing the physical location of the respective associated POI and indicates both the type of the associated POI an at least part of a status of the associated POI, as described above. In such an embodiment, transmitting may also include transmitting, at least in part, the annotated floor map to the client computing device, as described above.

In one embodiment, transmitting may include dividing the annotated floor map into a plurality of tiles, as described above. In such embodiment, transmitting may also include transmitting, to the client computing device, one or more of the tiles as a user requests to view a portion of the annotated floor map that includes the transmitted tiles, as described above. In various embodiments, one or more of the action(s) illustrated by this Block may be performed by the apparatuses or systems of FIG. 1, 3, 4, or 6, the map management systems 104, 304, and/or 404 of FIG. 1, 3, 4, or 6, as described above.

Block 814 illustrates that, in one embodiment, a request may be received from the computing device to perform a POI action in regards to one of the POIs, as described above. In some embodiments, in response to the request a determination as to whether or not the POI action may be performed either wholly locally or requires the assistance of a remote computing device may be made, as described above. In various embodiments, if the performance of the POI action requires assistance of the remote computing device, a POI action request message may be transmitted, to the remote computing device, as described above. In such an embodiment, the request may include a request to perform at least a portion of the POI action, as described above. In various embodiments, one or more of the action(s) illustrated by this Block may be performed by the apparatuses or systems of FIG. 1, 3, 4, or 6, the map management systems 104, 304, and/or 404 of FIG. 1, 3, 4, or 6, as described above.

Block 816 illustrates that, in one embodiment, a change in the POI metadata associated with at least one selected POI data structure may be detected, as described above. In various embodiments, in response to the detection, an update message may be transmitted to the client computing device, as described above. In various embodiments, the update message may include a change to the POI metadata and/or POI transient data, as described above. In various embodiments, one or more of the action(s) illustrated by this Block may be performed by the apparatuses or systems of FIG. 1, 3, 4, or 6, the map management systems 104, 304, and/or 404 of FIG. 1, 3, 4, or 6, as described above.

Figure 9:
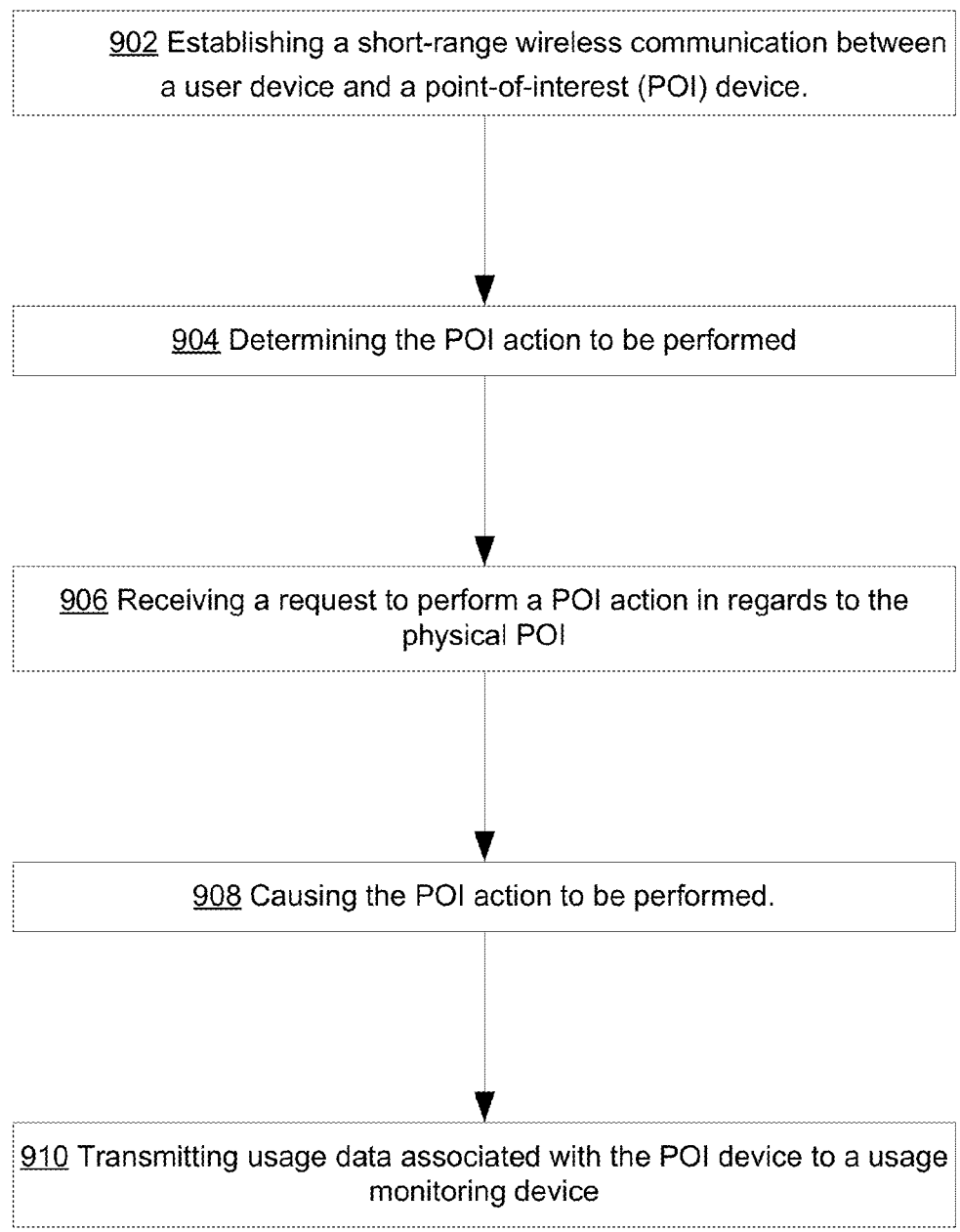
FIG. 9 is a flowchart of an example embodiment of a technique in accordance with the disclosed subject matter.

FIG. 9 is a flowchart of an example embodiment of a technique in accordance with the disclosed subject matter. In various embodiments, the technique 900 may be used or produced by the systems such as those of FIG. 1, 3, 4, or 6. Furthermore, portions of technique 900 may be use or produce maps such as that of FIG. 2, 4, or 5. Although, it is understood that the above are merely a few illustrative examples to which the disclosed subject matter is not limited. It is understood that the disclosed subject matter is not limited to the ordering of or number of actions illustrated by technique 900.

Block 902 illustrates that, in one embodiment, a short-range wireless communication may be established between a user device and a point-of-interest (POI) device, as described above. In various embodiments, the PoI device may be associated with a PoI data structure that represents a physical PoI, as described above. In one embodiment, the POI device may be located within the physical POI, and the physical POI may be a room, as described above. In various embodiments, one or more of the action(s) illustrated by this Block may be performed by the apparatuses or systems of FIG. 1, 3, 4, or 6, the user computing device 102, 302, and/or 602 of FIG. 1, 3, 4, or 6, as described above.

Block 904 illustrates that, in one embodiment, a POI action to be performed may be determined, as described above. In one embodiment, the determination may be based, at least partially, upon user role information associated with the user device, as described above. In another embodiment, the determination may be based, at least partially, upon a finite sate machine, as described above. In another embodiment, determining may include or may occur after a list of possible POI actions is read, via the short-range wireless communication, from the POI device, as described above. In various embodiments, one or more of the action(s) illustrated by this Block may be performed by the apparatuses or systems of FIG. 1, 3, 4, or 6, the user computing device 102, 302, and/or 602 of FIG. 1, 3, 4, or 6, and/or the PoI device 603 as described above.

Block 906 illustrates that, in one embodiment, a request to perform a POI action in regards to the physical POI may be received, as described above. In some embodiments, the POI data structure may include a status variable that indicates the status of the physical POI represented by the POI data structure, as described above. In such an embodiment, the POI action may include changing the status variable included by the POI data structure, as described above. In another embodiment, receiving a request to perform a POI action may include receiving, in response to establishing the short-range wireless communication between a user device and a point-of-interest (POI) device, a request to perform a first POI action, as described above. In various embodiments, one or more of the action(s) illustrated by this Block may be performed by the apparatuses or systems of FIG. 1, 3, 4, or 6, the user computing device 102, 302, and/or 602 of FIG. 1, 3, 4, or 6, as described above.

Block 908 illustrates that, in one embodiment, the POI action may be caused to be performed, as described above. In various embodiments, causing may include changing a POI indicator associated with the POI data structure on an annotated floor map, as described above. In such an embodiment, the annotated floor map may include a floor map and at least one point-of-interest indicator, wherein the point-of-interest indicator is placed on the floor map at a location dictated by an associated POI data structure, as described above.

As described above, in one embodiment, the request to perform a PoI action may include a request to perform a first PoI action. In such an embodiment, causing the POI action to be performed may include causing the first POI action to be performed, as described above. In some embodiments, in response to terminating the short-range wireless communication between a user device and a point-of-interest (POI) device, a request to perform a second POI action may be received, as described above. In such an embodiment, the second POI action may be caused to be performed, as described above. In various embodiments, one or more of the action(s) illustrated by this Block may be performed by the apparatuses or systems of FIG. 1, 3, 4, or 6, the user computing device 102, 302, and/or 602 of FIG. 1, 3, 4, or 6, as described above.

Block 910 illustrates that, in one embodiment, usage data associated with the POI device may be transmitted to a usage monitoring device, as described above. In some embodiments, the usage data may include a time at which the short-range wireless communication was established between the user device and the point-of-interest (POI) device. In various embodiments, one or more of the action(s) illustrated by this Block may be performed by the apparatuses or systems of FIG. 1, 3, 4, or 6, the user computing device 102, 302, and/or 602 of FIG. 1, 3, 4, or 6, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method of using an apparatus, the method comprising:
generating a floor map indicating a structural layout of a predefined physical location;
selecting a point-of-interest (POI) data structure representing a POI, at least one associated POI action and POI metadata associated with the POI, the POI data structure including a location of an associated POI, and the POI metadata including a POI indicating a type of the associated POI, and a POI status indicating the status of the associated POI, the actions associated with the POI being role based actions, the role based actions being based on at least one of a user of the apparatus or a user of a user device in communication with the apparatus, the actions associated with the POI including an action implemented through at least one of a uniform resource identifier (URI), a uniform resource locator (URL), or a workflow action, the actions associated with the POI including an indication as to whether or not the action is to be performed periodically; and
annotating the floor map by overlaying on the selected floor map an indicator for each selected POI data structure such that the indicator is placed on the floor map at a location representing the physical location of the respective associated POI and indicates both the type of the associated POI and the status of the associated POI.

2. The method of claim 1,
further comprising:
receiving a request to perform the POI action,
determining if the POI action may be performed either wholly locally or requires the assistance of a remote computing device, and
if the performance of the POI action requires assistance of the remote computing device, transmitting, via a network interface, a POI action request message, to the remote computing device, that includes a request to perform a portion of the POI action.

3. The method of claim 2, wherein the POI action includes an action that changes a state variable of the associated POI.

4. The method of claim 1, further comprising:
receiving a request by a user to display more information regarding the POI;
selecting additional POI metadata; and
communicating the additional POI metadata to the user.

5. The method of claim 1, wherein the point-of-interest (POI) data structure is associated with a physical location.

6. The method of claim 1, wherein the point-of-interest (POI) data structure is associated with a physical apparatus.

7. The method of claim 1, further comprising:
detecting that the user device has physically entered a triggering location; and
in response entering the triggering location, communicating the floor map, a point-of-interest (POI) data structure, and point-of-interest metadata to the user device.

8. The method of claim 1, wherein generating a floor map and selecting a point-of-interest (POI) data structure representing a point-of-interest includes:
generating an initial annotated floor map from the remote computing device, wherein the annotated floor map includes the floor map and the POI data structure; and
wherein generating an annotated floor map includes altering the initial annotated map based upon the POI metadata.

9. An apparatus comprising:
a network interface configured to:
generate a floor map indicating a structural layout of a predefined physical location, and
select a point-of-interest (POI) data structure representing a POI, at least one associated POI action and POI metadata associated with the POI t, the POI data structure including a location of an associated POI, and the POI metadata including a POI type indicating a type of the associated POI, and a POI status indicating the status of the associated POI, the actions associated with the POI being role based actions, the role based actions being based on at least one of a user of the apparatus or a user of a user device in communication with the apparatus, the actions associated with the POI including an action implemented through at least one of a uniform resource identifier (URI), a uniform resource locator (URL), or a workflow action, the actions associated with the POI including an indication as to whether or not the action is to be performed periodically;
a processor configured to:
annotate the floor map by overlaying on the selected floor map an indicator for each selected POI data structure such that the indicator is placed on the floor map at a location representing the physical location of the respective associated POI and indicates both the type of the associated POI and the status of the associated POI.

10. The apparatus of claim 9, and
the processor is further configured to:
receive a request to perform the POI action, and
determine if the POI action may be performed either wholly locally or requires the assistance of a remote computing device; and
the network interface is configured to, if the performance of the POI action requires assistance of the remote computing device, transmit a POI action request message, to the remote computing device, that includes a request to perform a portion of the POI action.

11. The apparatus of claim 10, wherein the POI action includes an action that changes a state variable of the associated POI.

12. The apparatus of claim 9, wherein the network interface is configured to:
receive a request by a user for more information regarding the POI, and
select additional POI metadata from the remote computing device; and
communicate the additional POI metadata to the user.

13. The apparatus of claim 9, wherein the point-of-interest (POI) data structure is associated with a physical location.

14. The apparatus of claim 9, wherein the point-of-interest (POI) data structure is associated with a physical apparatus.

15. The apparatus of claim 9, wherein the processor is configured to detect that a user device has physically entered a triggering location; and
wherein the network interface is configured to, in response entering the triggering location, request the floor map, a point-of-interest (POI) data structure, and point-of-interest metadata from the remote computing device.

16. The apparatus of claim 9, wherein the network interface is configured to generate an initial annotated floor map, wherein the annotated floor map includes the floor map and the POI data structure; and
wherein the processor is configured to alter the initial annotated map based upon the POI metadata.

17. A computer program product for asset management, the computer program product being tangibly and non-transitorily embodied on a computer-readable medium and including executable code that, when executed, is configured to cause an apparatus to:
  generate a floor map indicating a structural layout of a predefined physical location;
  select a point-of-interest (POI) data structure representing a POI, at least one associated POI action and POI metadata associated with the POI, the POI data structure including a location of an associated POI, and the POI metadata including a POI type indicating a type of the associated POI, and a POI status indicating the status of the associated POI, the actions associated with the POI being role based actions, the role based actions being based on at least one of a user of the apparatus or a user of a user device in communication with the apparatus, the actions associated with the POI including an action implemented through at least one of a uniform resource identifier (URI), a uniform resource locator (URL), or a workflow action, the actions associated with the POI including an indication as to whether or not the action is to be performed periodically; and
  annotate the selected floor map by overlaying on the selected floor map an indicator for each selected POI data structure such that the indicator is placed on the floor map at a location representing the physical location of the respective associated POI and indicates both the type of the associated POI and the status of the associated POI.

18. The computer-readable medium of claim 17, wherein the executable code that, when executed, is configured to cause the apparatus to:
  receive a request to perform a POI action, wherein the point-of-interest metadata includes at least one POI action that may be performed in relation to the POI;
  determine if the POI action may be performed either wholly locally or requires the assistance of a remote computing device; and
  if the performance of the POI action requires assistance of the remote computing device, transmit, via a network interface, a POI action request message, to the remote computing device, that includes a request to perform a portion of the POI action.

* * * * *